United States Patent
Yoshioka et al.

(10) Patent No.: US 12,120,683 B2
(45) Date of Patent: Oct. 15, 2024

(54) USER EQUIPMENT AND FEEDBACK INFORMATION TRANSMISSION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 514 days.

(21) Appl. No.: 17/420,912

(22) PCT Filed: Jan. 9, 2019

(86) PCT No.: PCT/JP2019/000416
§ 371 (c)(1),
(2) Date: Jul. 6, 2021

(87) PCT Pub. No.: WO2020/144787
PCT Pub. Date: Jul. 16, 2020

(65) Prior Publication Data
US 2022/0070847 A1    Mar. 3, 2022

(51) Int. Cl.
*H04W 72/20* (2023.01)
*H04W 4/40* (2018.01)

(52) U.S. Cl.
CPC ............ *H04W 72/20* (2023.01); *H04W 4/40* (2018.02)

(58) Field of Classification Search
None
See application file for complete search history.

(56) References Cited

U.S. PATENT DOCUMENTS

| | | | |
|---|---|---|---|
| 2015/0180635 A1 | 6/2015 | Fujishiro et al. | |
| 2021/0288778 A1* | 9/2021 | Park | H04L 1/1858 |
| 2021/0306824 A1* | 9/2021 | Li | H04W 4/40 |
| 2021/0400635 A1* | 12/2021 | Blasco Serrano | H04L 1/1858 |
| 2021/0400687 A1* | 12/2021 | Yeo | H04W 72/1263 |
| 2022/0053496 A1* | 2/2022 | Yu | H04L 1/1896 |

FOREIGN PATENT DOCUMENTS

| | | |
|---|---|---|
| JP | 2018-056813 A | 4/2018 |
| WO | 2014/017503 A1 | 1/2014 |

OTHER PUBLICATIONS

International Search Report issued in PCT/JP2019/000416 on Feb. 12, 2019 (4 pages).
Written Opinion of the International Searching Authority issued in PCT/JP2019/000416 on Feb. 12, 2019 (4 pages).

(Continued)

*Primary Examiner* — Anh Vu H Ly
(74) *Attorney, Agent, or Firm* — Osha Bergman Watanabe & Burton LLP

(57) ABSTRACT

A user equipment including: a reception unit configured to receive sidelink data from a transmission side user equipment; and a transmission unit configured to transmit feedback information for the sidelink data, wherein the transmission unit transmits the feedback information using a resource determined based on a transmission ID that is an ID on the transmission side user equipment, or a reception ID that is an ID on the user equipment, or both of the transmission ID and the reception ID.

4 Claims, 12 Drawing Sheets

(56) References Cited

OTHER PUBLICATIONS

ITL; "Discussion on NR V2X HARQ mechanism"; 3GPP TSG RAN WG1 Meeting #95, R1-1813976; Spokane, USA; Nov. 12-16, 2018 (4 pages).
Huawei, HiSilicon; "Design and contents of PSCCH and PSFCH"; 3GPP TSG RAN WG1 Meeting #95, R1-1813554; Spokane, USA; Nov. 12-16, 2018 (7 pages).
Sony; "Discussion on HARQ feedback for NR V2X communication"; 3GPP TSG RAN WG1 Meeting #95, R1-1813138; Spokane, USA; Nov. 12-16, 2018 (4 pages).
3GPP TS 36.211 V15.3.0; "3rd Generation Partnership Project; Technical Specification Group Radio Access Network; Evolved Universal Terrestrial Radio Access (E-UTRA); Physical channels and modulation (Release 15)"; Sep. 2018 (243 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
Office Action issued in counterpart Chinese Patent Application No. 201980088116.6 mailed on Jun. 8, 2023 (15 pages).
Partial Supplementary European Search Report issued in counterpart European Patent Application No. 19909120.8, mailed on Jun. 24, 2022 (12 pages).
ITL; "Discussion on NR V2X HARQ mechanism"; 3GPP TSG-RAN WG1 Meeting #94bis, R1-1811615; Chengdu, China; Oct. 8-12, 2018 (4 pages).
Office Action issued in the counterpart Japanese Patent Application No. 2020-565089, mailed on Feb. 14, 2023 (6 pages).
Office Action issued in Korean Patent Application No. 10-2021-7023168, mailed on Mar. 27, 2024 (7 pages).

* cited by examiner

USER EQUIPMENT AND FEEDBACK INFORMATION TRANSMISSION METHOD

TECHNICAL FIELD

The present invention relates to a user equipment in a wireless communication system.

BACKGROUND ART

In LTE (Long Term Evolution) and LTE successor systems (e.g., LTE-A (LTE Advanced), NR (New Radio) (5G)), a D2D (Device to Device) technology in which user equipments communicate directly with each other without using a base station apparatus is under consideration (e.g., Non-Patent Document 1).

The D2D reduces traffic between the user equipment and the base station apparatus and enables communication between user equipments even when the base station apparatus is unable to communicate during a disaster, etc. In the 3rd Generation Partnership Project (3rd GPP), D2D is called "sidelink".

D2D communication is broadly classified into D2D discovery (also referred to as D2D discovery and D2D discovery) for discovering other user equipments capable of communication, and D2D communication (D2D direct communication, D2D communication, terminal-to-terminal direct communication, etc.) for communicating directly between user equipments. Hereinafter, when D2D communication, D2D discovery, etc. are not specifically distinguished, it is simply referred to as D2D (or sidelink signal). A signal sent and received by D2D is called a D2D signal. Various use cases of V2X (Vehicle to Everything) services in NR have been studied (e.g., Non-Patent Document 2).

PRIOR ART DOCUMENTS

Non-Patent Documents

[Non-Patent Document 1] 3GPP TS 36.211 V15.3.0 (2018 September)
[Non-Patent Document 2] 3GPP TR 22.886 V15.1.0 (2017 March)

SUMMARY OF INVENTION

Problem to be Solved by the Invention

In sidelink communication in V2X, it is assumed that HARQ (Hybrid Automatic Repeat reQuest) operation will be executed between user equipments in order to perform retransmission control. However, in the prior art of sidelink including V2X, a specific method of HARQ operation has not been proposed, and thus there is a problem that the conventional sidelink cannot perform the HARQ operation properly.

For example, if HARQ-ACK information is transmitted from multiple user equipments on the same resource, the user equipment that received certain HARQ-ACK information cannot identify whether the received HARQ-ACK information is transmitted from the user equipment that received the transmitted data transmitted by itself. Accordingly, there is a possibility of misunderstanding that transmission of data has failed by receiving a NACK instead of receiving ACK correctly.

The present invention has been made in view of the foregoing, and is intended to provide a technique for enabling proper execution of HARQ operations in sidelink.

Means for Solving Problems

According to the disclosed technique, there is provided a user equipment including:
a reception unit configured to receive sidelink data from a transmission side user equipment; and
a transmission unit configured to transmit feedback information for the sidelink data,
wherein the transmission unit transmits the feedback information using a resource determined based on a transmission ID that is an ID on the transmission side user equipment, or a reception ID that is an ID on the user equipment, or both of the transmission ID and the reception ID.

Effects of the Invention

According to the disclosed technique, a technique is provided which enables the proper execution of HARQ operation in sidelink.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. However, the existing technology is, for example, an existing LTE, but is not limited to an existing LTE. The term "LTE" as used herein shall also have a broad meaning including LTE-Advanced and a scheme after LTE-Advanced (e.g., NR) or WLAN (Local Area Network), unless otherwise specified.

The following description also uses the names of channels such as PSSCH (Physical Sidelink Shared Channel) and PSCCH (Physical Sidelink Control Channel), which are currently described in the LTE specification. In the NR, channels with similar functions may be called with different names. The PSSCH is referred to as a data channel for the sidelink, and PSCCH is referred to as a control channel for the sidelink.

In embodiments of the present invention, the duplex method may be a TDD (Time Division Duplex) method, a FDD (Frequency Division Duplex) method, or any other method (e.g., Flexible Duplex, etc.).

Figure 1:
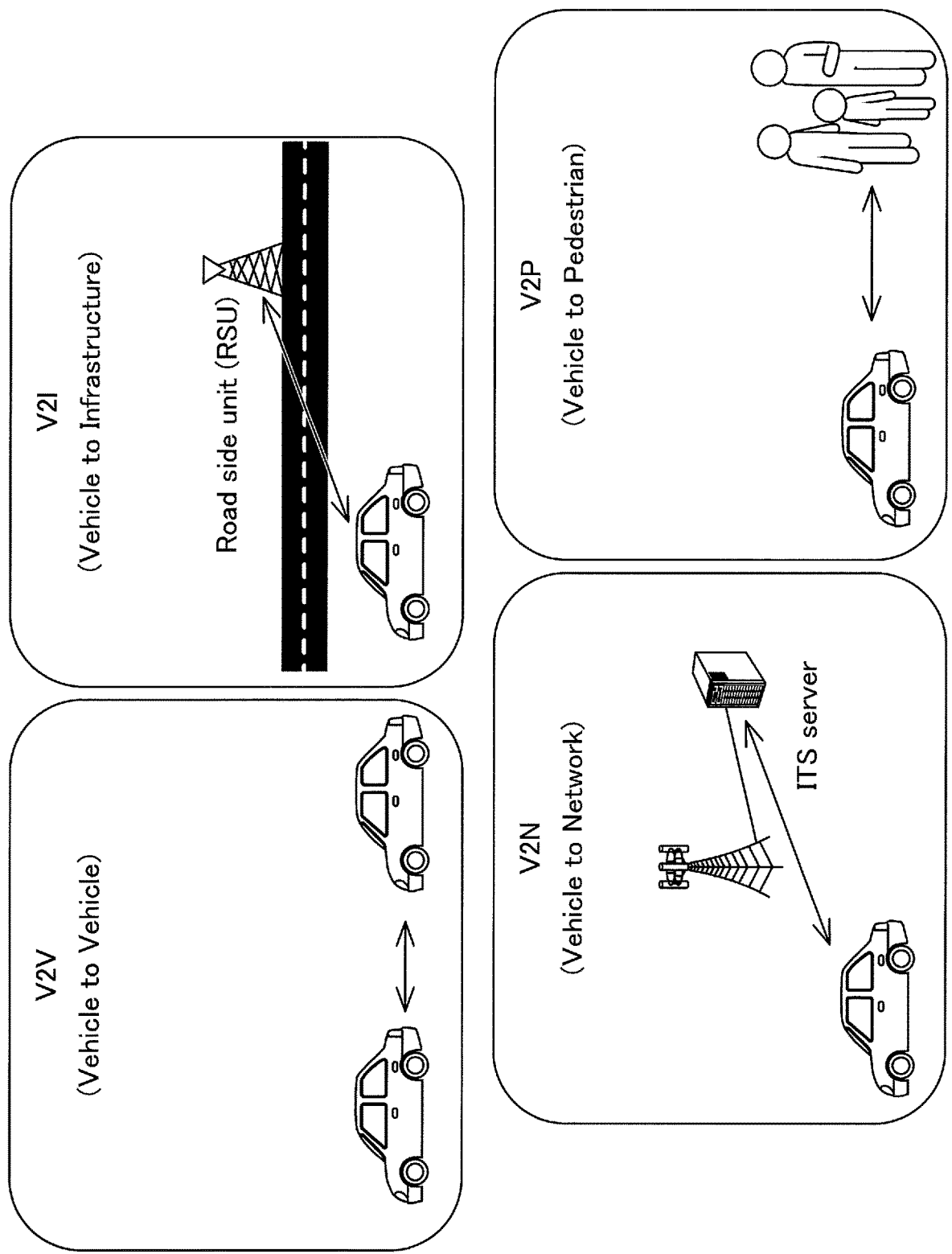
FIG. 1 is a diagram for explaining V2X.

FIG. 1 is a diagram for explaining V2X. In the 3GPP, the D2D function is being extended to realize either V2X (Vehicle to Everything) or eV2X (enhanced V2X) and specification is being studied. As shown in FIG. 1, V2X is a collective term for V2V (Vehicle to Vehicle), which is part of ITS (Intelligent Transport Systems), which means the form of communication between vehicles, V2I (Vehicle to Infrastructure), which means the form of communication between vehicles and roadside equipment (Road-Side Unit), V2N (Vehicle to Network), which means the form of communication between vehicles and ITS servers, and V2P (Vehicle to Pedestrian), which means the form of communication between vehicles and mobile terminals owned by pedestrians.

In addition, V2X using LTE or NR cellular communication and terminal-to-terminal communication is being studied in 3GPP. V2X using cellular communication is also called cellular V2X. NR's V2X is considering realizing large capacity, low delay, high reliability, and Qos (Quality of Service) control.

It is anticipated that the V2X of LTE or NR will be studied not limited to the 3GPP specification in the future. For example, it is envisaged that interoperability, cost reduction by upper layer implementation, use of combination of multiple RATs (Radio Access Technology) or methods for switching them, regulatory compliance in each country, data acquisition, distribution, database management and use of it in LTE or NR V2X platforms will be considered.

Embodiments of the present invention are primarily assumed to include a user equipment mounted in a vehicle, but embodiments of the present invention are not limited to such embodiments. For example, the user equipment may be a terminal held by a person, the user equipment may be a drone or a device mounted on an aircraft, a device in which the user equipment has base station capabilities, an RSU, a relay node, a user equipment having scheduling capabilities, and the like.

Note that SL (Sidelink) may be distinguished on the basis of either UL (Uplink), DL (Downlink), 1)-4) below or combinations of them. The SL may also be another name.
  1) Resource allocation in the time domain
  2) Frequency domain resource allocation
  3) Synchronization signal (including SLSS (Sidelink Synchronization Signal)) to be referenced
  4) Reference signal used for pathloss measurement for transmission power control Also, for SL or UL OFDM (Orthogonal Frequency Division Multiplexing), either CP-OFDM (Cyclic-Prefix OFDM), DFT-S-OFDM (Discrete Fourier Transform-Spread-OFDM), OFDM without Transform precoding or OFDM with Transform precoding may be applied.

In the SL of LTE, Mode3 and Mode4 are specified for allocating SL resources to the user equipment 20. In Mode3, transmitting resources are dynamically allocated by a DCI (Downlink Control Information) transmitted from the base station apparatus 10 to the user equipment 20. In Mode3, SPS (Semi Persistent Scheduling) is also possible. In Mode4, the user equipment 20 autonomously selects transmit resources from a resource pool.

A slot in embodiments of the present invention may be replaced by a symbol, a minislot, a subframe, a radio frame, or a TTI (Transmission Time Interval). Cells in embodiments of the present invention may also be read as cell groups, carrier components, BWPs, resource pools, resources, RAT (Radio Access Technology), systems (including wireless LANs), and the like.

Figure 2:
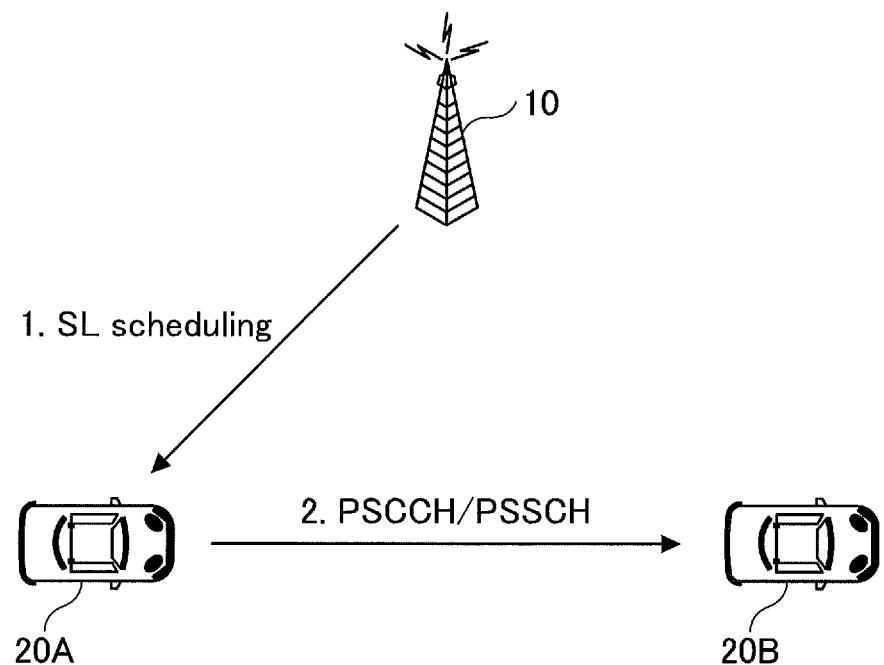
FIG. 2 is a diagram illustrating an example (1) of a transmission mode of V2X.

FIG. 2 is a diagram for explaining an example (1) of a transmission mode of V2X. In the transmission mode of the sidelink communication shown in FIG. 2, in Step 1, the base station apparatus 10 transmits a sidelink scheduling to the user equipment 20A. Subsequently, the user equipment 20A transmits PSCCH (Physical Sidelink Control Channel) and PSSCH (Physical Sidelink Shared Channel) to the user equipment 20B based on the received scheduling (Step 2). The transmission mode of the sidelink communication shown in FIG. 2 may be referred to as a sidelink transmission mode 3 in the LTE. In the sidelink transmission mode 3 in the LTE, Uu-based sidelink scheduling is performed. Uu is a wireless interface between UTRAN (Universal Terrestrial Radio Access Network) and UE (User Equipment). The transmission mode of the sidelink communication shown in FIG. 2 may be referred to as the sidelink transmission mode 1 in the NR.

Figure 3:
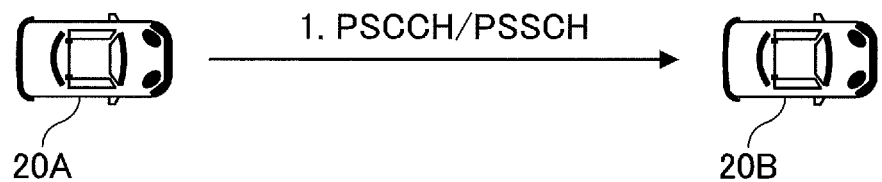
FIG. 3 is a diagram illustrating an example (2) of a transmission mode of V2X.

FIG. 3 is a diagram for explaining an example (2) of a transmission mode of V2X. In the sidelink communication transmission mode shown in FIG. 3, in step 1, the user equipment 20A transmits PSCCH and PSSCH to the user equipment 20B using autonomously selected resources. The transmission mode of the sidelink communication shown in FIG. 3 may be referred to as the sidelink transmission mode 4 in the LTE. In the sidelink transmission mode 4 in the LTE, the UE itself performs resource selection.

Figure 4:
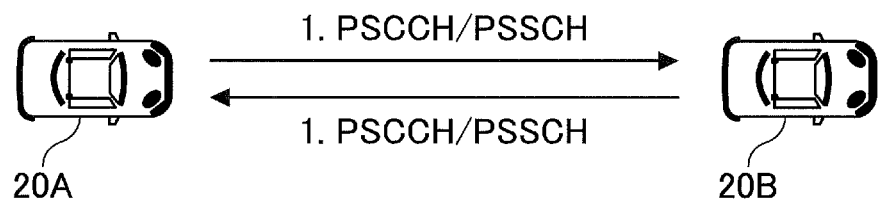
FIG. 4 is a diagram illustrating an example (3) of a transmission mode of V2X.

FIG. 4 is a diagram for explaining an example (3) of a transmission mode of V2X. In the sidelink communication transmission mode shown in FIG. 4, in step 1, the user equipment 20A transmits PSCCH and PSSCH to the user equipment 20B using autonomously selected resources. Similarly, user equipment 20B transmits PSCCH and PSSCH to user equipment 20A using autonomously selected resources (step 1). The transmission mode of the sidelink communication shown in FIG. 4 may be referred to as the sidelink transmission mode 2a in the NR. In the sidelink transmission mode 2 in the NR, the UE itself performs resource selection.

Figure 5:
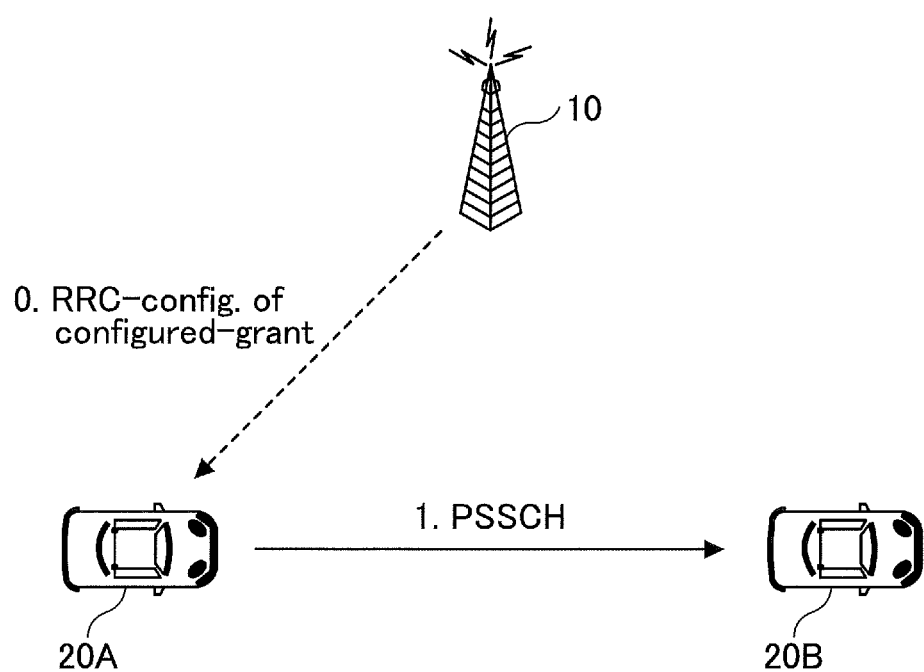
FIG. 5 is a diagram illustrating an example (4) of a transmission mode of V2X.

FIG. 5 is a diagram for explaining an example (4) of a transmission mode of V2X. In the sidelink communication transmission mode shown in FIG. 5, in step 0, the base station apparatus 10 transmits the sidelink scheduling grant to the user equipment 20A via the RRC (Radio Resource Control) configuration. Subsequently, the user equipment 20A transmits the PSSCH to the user equipment 20B based on the received scheduling (Step 1). The transmission mode of the sidelink communication shown in FIG. 5 may be referred to as the sidelink transmission mode 2c in the NR.

Figure 6:
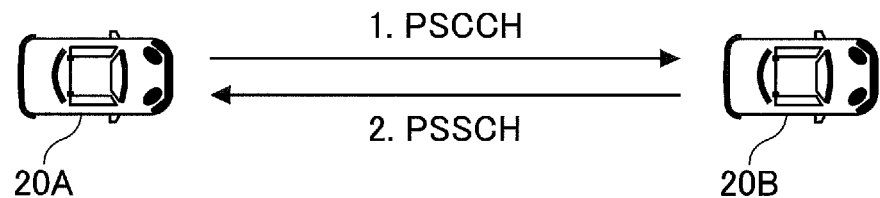
FIG. 6 is a diagram illustrating an example (5) of a transmission mode of V2X.

FIG. 6 is a diagram for explaining an example (5) of a transmission mode of V2X. In the transmission mode of the sidelink communication shown in FIG. 6, in step 1, the user equipment 20A transmits the sidelink scheduling to the user equipment 20B via the 10 PSCCH. Subsequently, the user equipment 20B transmits the PSSCH to the user equipment 20A based on the received scheduling (Step 2). The transmission mode of the sidelink communication shown in FIG. 6 may be referred to as the sidelink transmission mode 2d in the NR. In the configuration shown in FIG. 2, the configuration in which the base station apparatus 10 is replaced with the user equipment 20 (in this case, the information transmission in Step 1 is executed by the PSCCH) may be referred to as the sidelink transmission mode 2d.

Figure 7:
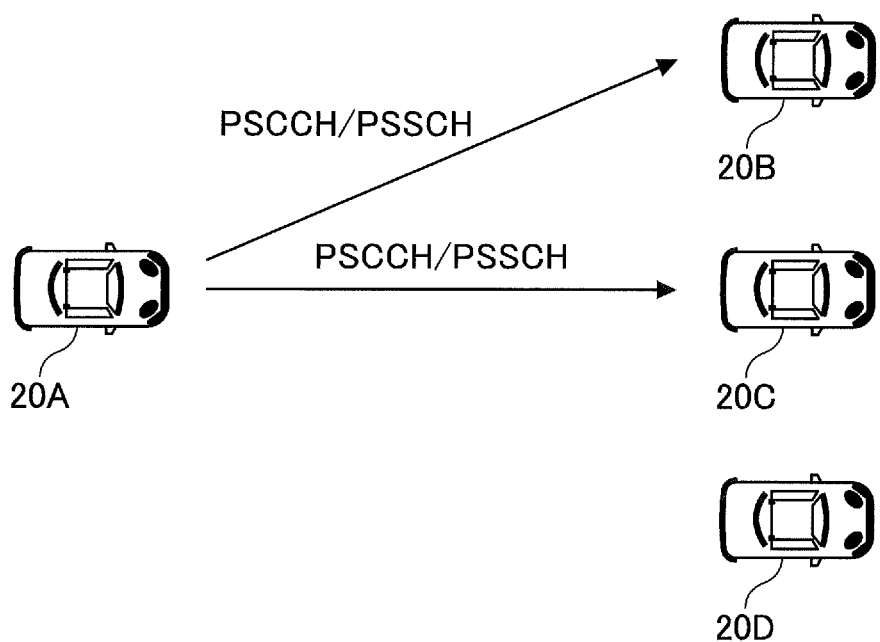
FIG. 7 is a diagram illustrating an example (1) of a communication type of V2X.

FIG. 7 is a diagram for explaining an example (1) of a communication type of V2X. The sidelink communication type shown in FIG. 7 is unicast. User equipment 20A transmits PSCCH and PSSCH to user equipment 20. In the example shown in FIG. 7, the user equipment 20A unicasts the user equipment 20B and unicasts the user equipment 20C.

Figure 8:
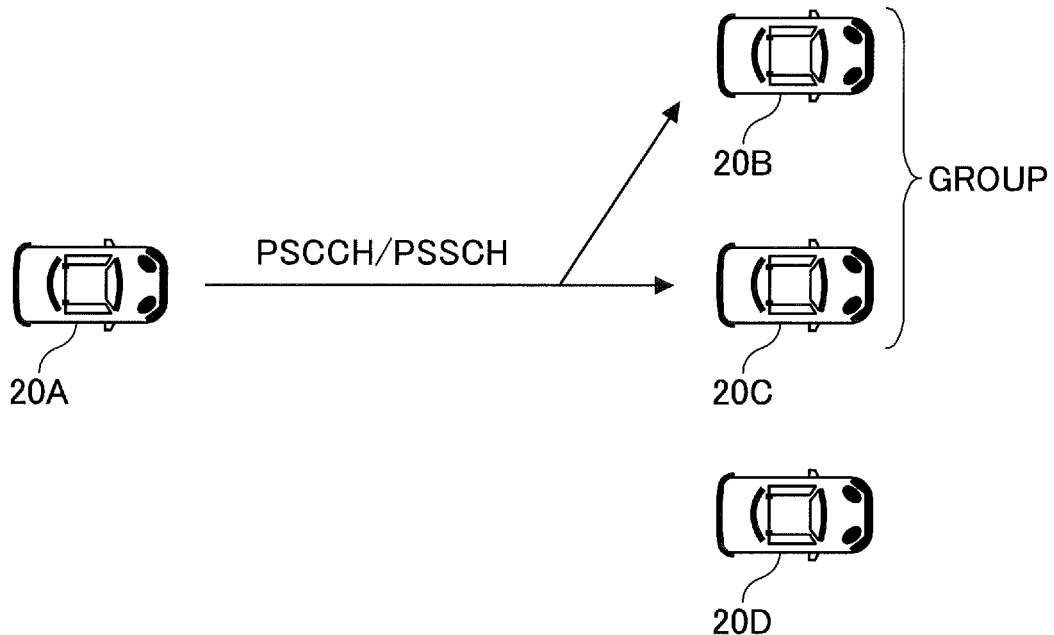
FIG. 8 is a diagram illustrating an example (2) of a communication type of V2X.

FIG. 8 is a diagram for explaining an example (2) of a communication type of V2X. The sidelink communication type shown in FIG. 8 is a group cast. User equipment 20A transmits PSCCH and PSSCH to a group to which one or more user equipments 20 belong. In the example shown in FIG. 8, the group includes a user equipment 20B and a user equipment 20C, and the user equipment 20A performs group casting on the group.

Figure 9:
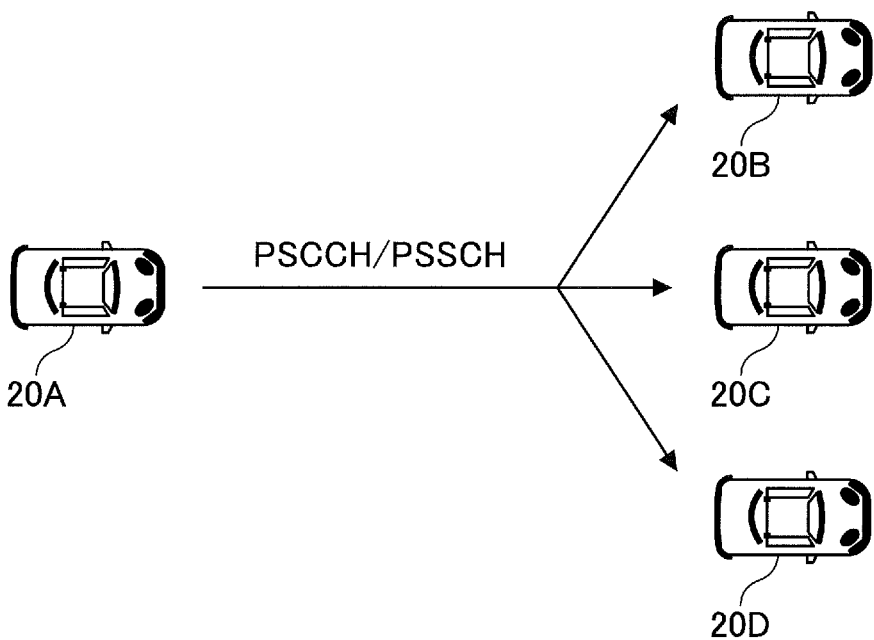
FIG. 9 is a diagram illustrating an example (3) of a communication type of V2X.

FIG. 9 is a diagram for explaining an example (3) of a communication type of V2X. The sidelink communication type shown in FIG. 9 is broadcast. User equipment 20A transmits PSCCH and PSSCH to one or more user equipments 20. In the example shown in FIG. 9, the user equipment 20A broadcasts to the user equipment 20B, the user equipment 20C, and the user equipment 20D. The user equipment 20A shown in FIGS. 7 to 9 may be referred to as a header UE.

In addition, it is assumed that HARQ is supported for unicasts and group casts of sidelink in NR-V2X. In addition, SFCI (Sidelink Feedback Control Information) containing HARQ response is defined in NR-V2X. In addition, SFCI transmission via PSFCH (Physical Sidelink Feedback Channel) is under consideration.

In the following description, PSFCH is used for sending HARQ-ACK (or CSI (Channel State Information), SR (Sounding Reference Signal)) on a sidelink. This is an example. For example, PSCCH may be used to transmit HARQ-ACK (or CSI, SR) at the sidelink, PSSCH may be used to transmit HARQ-ACK (or CSI, SR) at the sidelink, or other channels may be used to transmit HARQ-ACK (or CSI, SR) at the sidelink.

(Example of Sidelink Communication Scenario)

Next, an example of a sidelink communication scenario related to a problem to be solved by the technique described in this embodiment will be described with reference to FIGS. 10 to 14.

Figure 10:
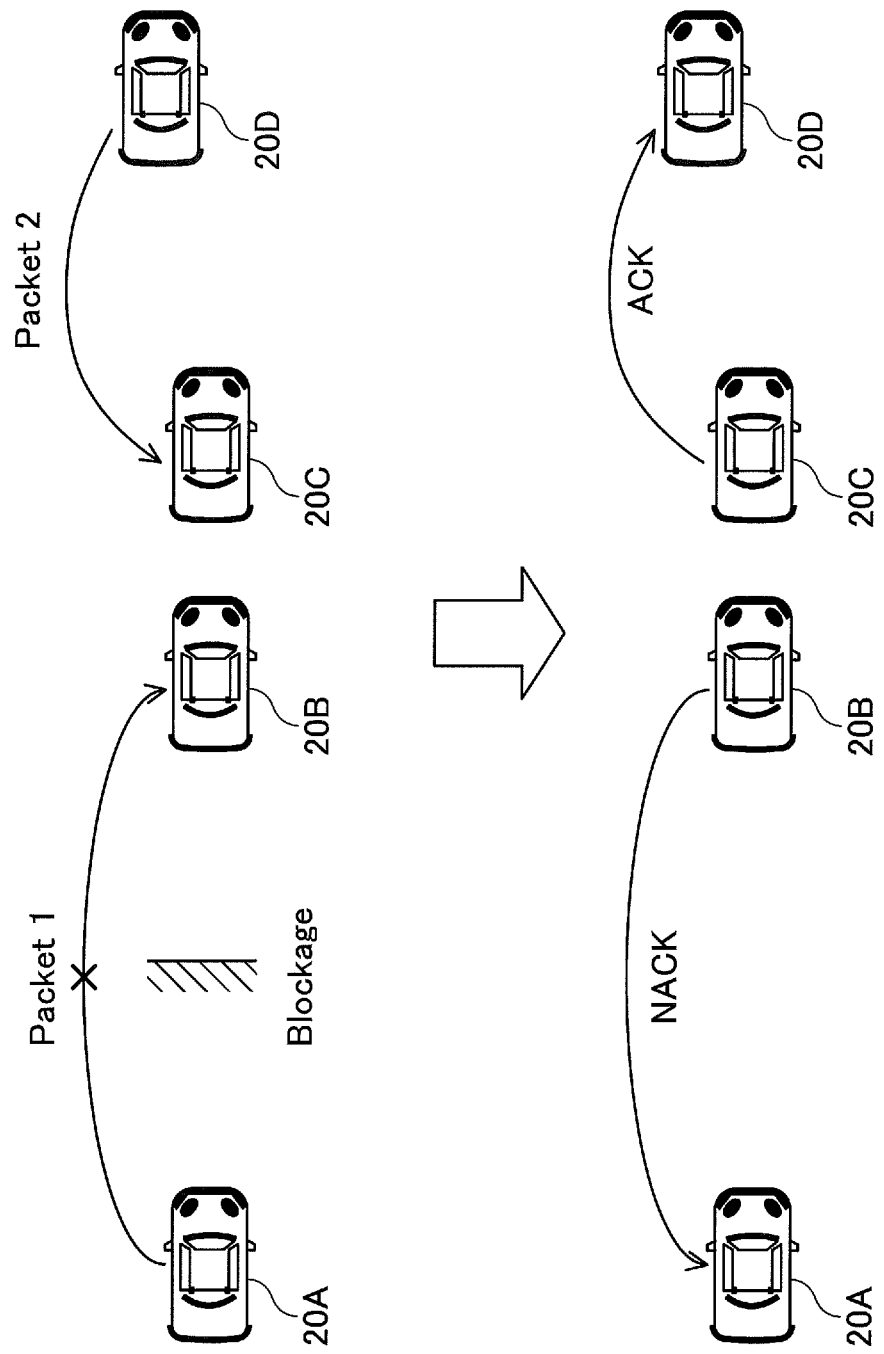
FIG. 10 shows an example of a scenario.

In the example shown in FIG. 10, the user equipment 20A transmits a packet 1 to the user equipment 20B, but the transmission fails and the user equipment 20B cannot receive the packet 1 correctly. Meanwhile, the user equipment 20D transmits a packet 2 to the user equipment 20C and succeeds in transmitting the packet, and the user equipment 20C receives the packet 2.

In this case, for example, when the user equipment 20A and the user equipment 20D notify the packet destination of the same resource as a resource for the HARQ-ACK, the user equipment 20B and the user equipment 20C each transmit the HARQ-ACK information using the same resource. Specifically, using the same resources, the user equipment 20B transmits NACK and user equipment 20C transmits ACK.

Figure 11:
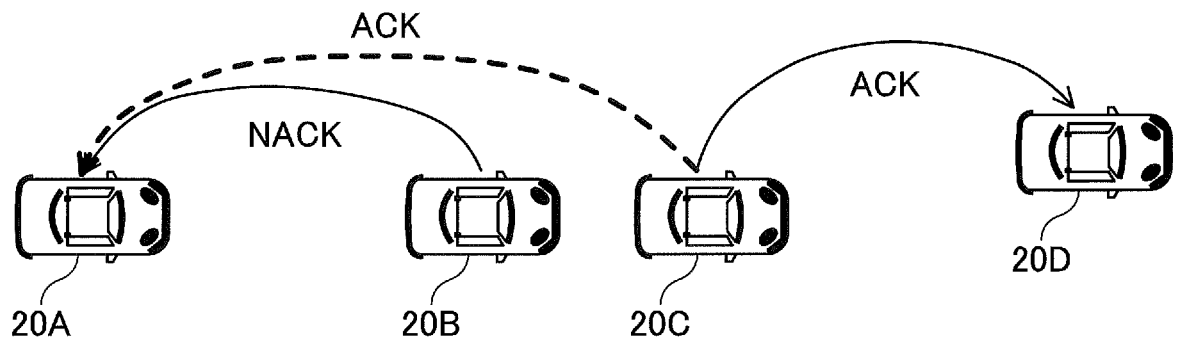
FIG. 11 is a diagram showing an example of misunderstanding.

Since the user equipment 20B and the user equipment 20C use the same resource for transmitting the HARQ-ACK information, the user equipment 20A may receive the ACK transmitted from the user equipment 20C, for example, as shown in FIG. 11. Thus, the user equipment 20A may misunderstand that the packet 1 was successfully transmitted by receiving the ACK.

Figure 12:
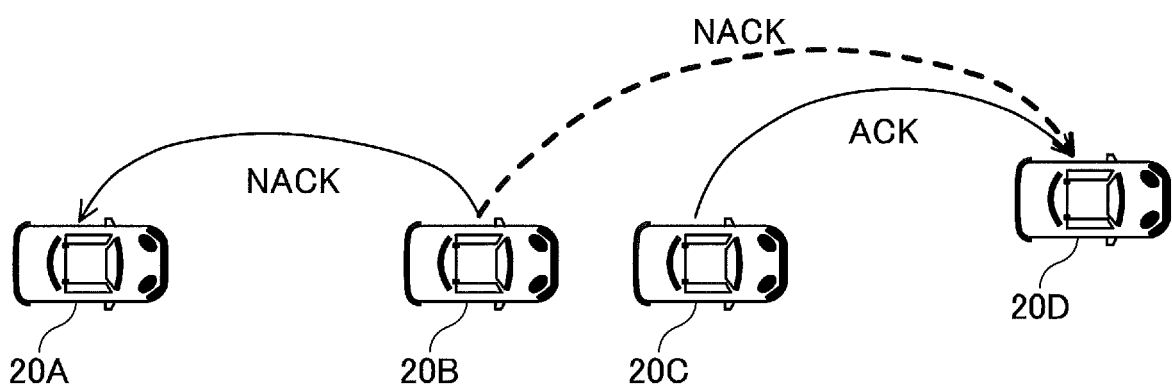
FIG. 12 is a diagram showing an example of misunderstanding.

As shown in FIG. 12, the user equipment 20D may receive the NACK transmitted from the user equipment 20B. Thus, the user equipment 20D may misunderstand that the transmission of the packet 2 failed due to receiving the NACK.

Figure 13:
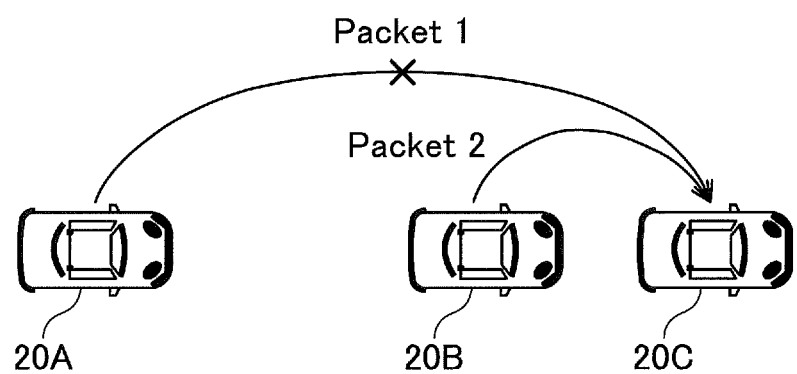
FIG. 13 shows an example of a scenario.
Figure 14:
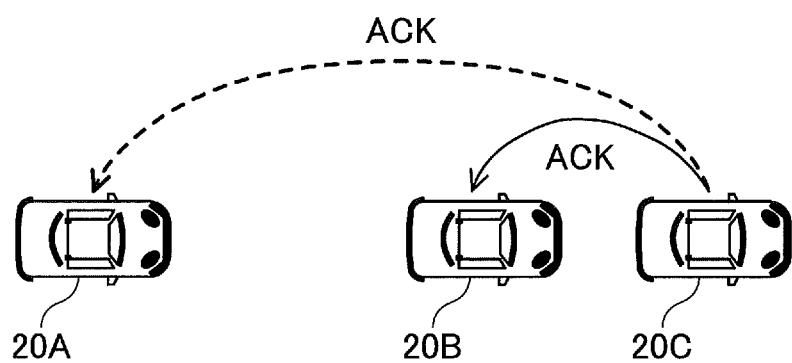
FIG. 14 is a diagram showing an example of misunderstanding.

Another example is shown in FIGS. 13 and 14. In the example shown in FIG. 13, for example, since the user equipment 20A and the user equipment 20B selected the same data transmission resource, the user equipment 20A transmits the packet 1 to the user equipment 20C, but the transmission fails, and the user equipment 20C cannot receive the packet 1 correctly. Meanwhile, the user equipment 20B transmits the packet 2 to the user equipment 20C and successfully transmits the packet. The user equipment 20C receives the packet 2.

In this case, for example, when the user equipment 20A and the user equipment 20B notify the packet destination of the same resource as a resource for the HARQ-ACK, the user equipment 20C selects the same resource for transmitting the HARQ-ACK information between the user equipment 20A and the user equipment 20B.

Therefore, as shown in FIG. 14, the user equipment 20A may receive an ACK transmitted from the user equipment 20C to the user equipment 20B. Thus, the user equipment 20A may misunderstand that the packet 1 was successfully transmitted by receiving the ACK.

In the present embodiment, in order to solve the problem that the misunderstanding of the HARQ-ACK information occurs as described above, the user equipment 20 that transmits the HARQ-ACK information transmits all or part of a transmission ID (transmitter-ID (identifier)) implicitly or explicitly with the HARQ-ACK information. HARQ-ACK information may be referred to as feedback information. The "ID" may also be referred to as an identifier or identification information.

The transmission ID is an ID related to the user equipment 20 that transmits data (PSSCH) corresponding to the HARQ-ACK information. The transmission ID may be, for example, an RNTI, a UE-ID, or a group (cast)-ID, but is not particularly limited. The group-ID as the transmission ID is, for example, an ID of a group to which a user equipment 20 transmitting data belongs.

As will be described later, a reception ID (receiver-ID) can be used instead of (or in addition to) the transmission ID. The reception ID is an ID related to the user equipment 20 that receives data (PSSCH) corresponding to the HARQ-ACK information. The reception ID may be, for example, an RNTI, a UE-ID, or a group (cast)-ID, but is not particularly limited. The group-ID as the reception ID is, for example, an ID of a group to which the user equipment 20 that receives data belongs.

Specific techniques for solving the above-described problems will be described with reference to Examples 1 to 4. It should be noted that any two or all three of Examples 1 to 3 may be performed in combination. Example 4 is also applicable to the combined embodiment in this manner.

Example 1

<Example Configuration of Example 1>

Figure 15:
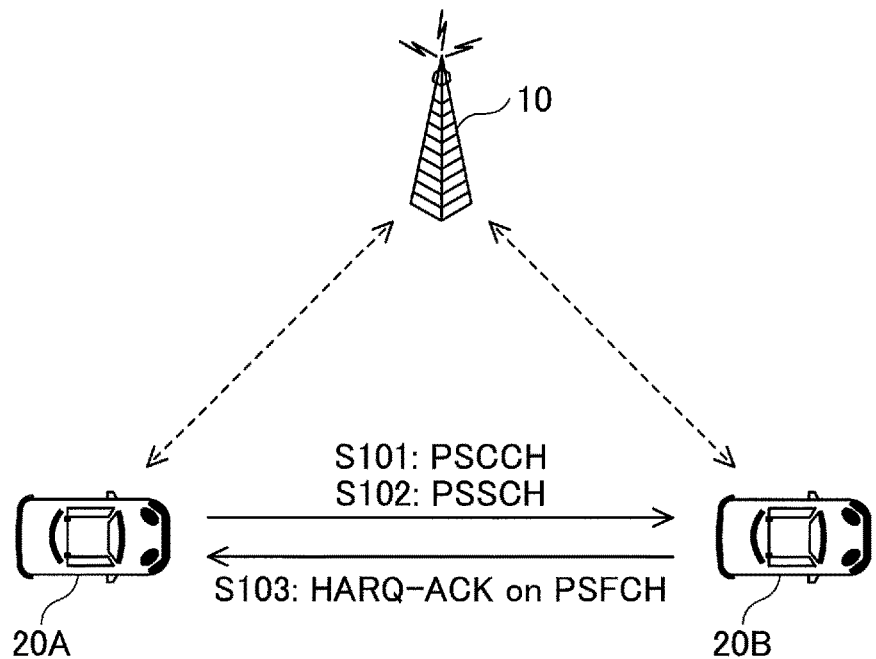
FIG. 15 is a diagram illustrating an example of a system configuration in an embodiment.

FIG. 15 is a diagram illustrating a configuration (and a signal flow) of the wireless communication system according to the Example 1. Since this configuration (and the signal flow, and the description of the user equipment 20 and base station apparatus 10 described below) is similar in Examples 2 and 3, FIG. 15 is also used in Examples 2, 3, and 4.

As shown in FIG. 15, the wireless communication system according to the Example 1 includes a base station apparatus 10, a user equipment 20A, and a user equipment 20B. In practice, there are a number of user equipments, but FIG. 15 shows, as examples, a user equipment 20A and a user equipment 20B. In addition to the user equipment 20A and the user equipment 20B, as appropriate, the user equipment 20C, the user equipment 20D, and the like are shown in this specification. When the user equipments 20A, 20B, etc. are not specifically distinguished, they are simply described as "user equipment 20" or "user equipment."

In the example of FIG. 15, the base station apparatus 10 is shown, but a configuration in which the base station apparatus 10 is not present, i.e., a configuration in which the user equipment 20A and the user equipment 20B are out of cell coverage is possible.

If the user equipment 20A is within the cell coverage, for example, as shown in FIG. 2, the user equipment 20A may receive SL scheduling information from the base station apparatus 10, and the user equipment 20A may transmit data to the user equipment 20B based on the SL scheduling information.

In this embodiment, the user equipment 20 is, for example, a device mounted in a vehicle such as an automobile and has a function of cellular communication as a UE in LTE or NR and a sidelink function. User equipment 20 may be a conventional portable terminal (such as a smartphone). The user equipment 20 may also be an RSU. The RSU may be a UE-type RSU having the function of a UE or a gNB-type RSU having the function of a base station apparatus.

The user equipment 20 need not be a single housing device. For example, even when various sensors are distributed in a vehicle, the device including the various sensors is the user equipment 20.

Further, the processing contents of the transmission data of sidelink of the user equipment 20 are basically the same as the processing contents of the UL transmission in the LTE or NR. For example, the user equipment 20 scrambles the code word of the transmission data, modulates to generate complex-valued symbols, and maps the complex-valued symbols to one or two layers for precoding. The precoded complex-valued symbols are then mapped to a resource element to generate a transmission signal (e.g., complex-valued time-domain SC-FDMA signal) and transmit it from each antenna port.

The base station apparatus 10 has a function of cellular communication as a base station in the LTE or NR and a function of enabling communication of the user equipment 20 according to the present embodiment (e.g., resource pool configuration, resource allocation, etc.). The base station apparatus 10 may be an RSU (gNB-type RSU).

In the wireless communication system according to the Example 1 (same in other examples), the signal waveform used by the user equipment 20 for SL or UL may be OFDMA, SC-FDMA, or other signal waveform.

<Operation Example of Example 1>

In Example 1, a PSFCH resource for transmitting HARK-ACK information is determined based on a transmission ID. That is, in the example shown in FIG. 15, in S101 and S102, the user equipment 20A transmits a SCI (Sidelink Control Information) by a PSCCH and transmits SL data by a PSSCH.

The user equipment 20B receives a SCI (PSCCH) and SL data (PSSCH) transmitted from the user equipment 20A. For example, the SCI received by the PSCCH includes a transmission ID of the user equipment 20A.

The user equipment 20B determines a resource for transmitting HARQ-ACK information based on the transmission ID included in the received SCI and uses the resource to transmit HARQ-ACK information. The user equipment 20A may determine a resource for transmitting the HARQ-ACK information based on the transmission ID and notify the information of the resource to the user equipment 20B by the SCI.

The user equipment 20A expects to receive the HARQ-ACK information (monitors the HARQ-ACK information) with a resource determined based on the transmission ID. If the user equipment 20A receives ACK with the resource, the data transmitted by S102 can be confirmed to have been transmitted to the user equipment 20B normally.

When the user equipment 20A receives NACK by the resource or receives nothing, the data transmission of S102 can be recognized as a failure and retransmission can be performed.

The resource determined based on the transmission ID may be any one of a sequence, a code, a time, and a frequency, and may be any two combinations of them, any three combinations of them, or four combinations of them.

A method of determining a resource based on a transmission ID is not limited to a specific method. For example, there is a method in which a function that outputs information representing a resource (e.g., a slot number or symbol number if it is a time resource) from the transmission ID is defined, and the function is used. Also there is a method in which a table in which transmission IDs are associated with information indicating resources is defined to use the table.

For example, suppose that the resource determined by a transmission ID is a time and frequency resource, and that, for a different transmission ID, a different time and frequency resource (orthogonal time and frequency resources) is determined. If, for example, it is possible to allocate 10 orthogonal time and frequency resources in one transmission of information (reception in reception side) by a PSFCH resource at a certain timing, the user equipment 20A on the receiving side of the HARQ-ACK can expect HARQ-ACK information from 10 different user equipments 20.

A time and frequency resource of the PSFCH may be specified by a SCI from the user equipment 20A on the data transmission side to the user equipment 20B, and a sequence of the HARQ-ACK information to be transmitted by the user equipment 20B on the data reception side may be determined by the transmission ID. In this case, in the example of FIG. 15, for example, the user equipment 20A transmits a SCI containing information on the time and frequency resource of PSFCH along with the transmit ID at S101.

Alternatively, a PSFCH time and frequency resource may be associated with one or both of a PSCCH resource and a PSSCH resource transmitted by the user equipment 20A at S101 and S102.

Figure 16:
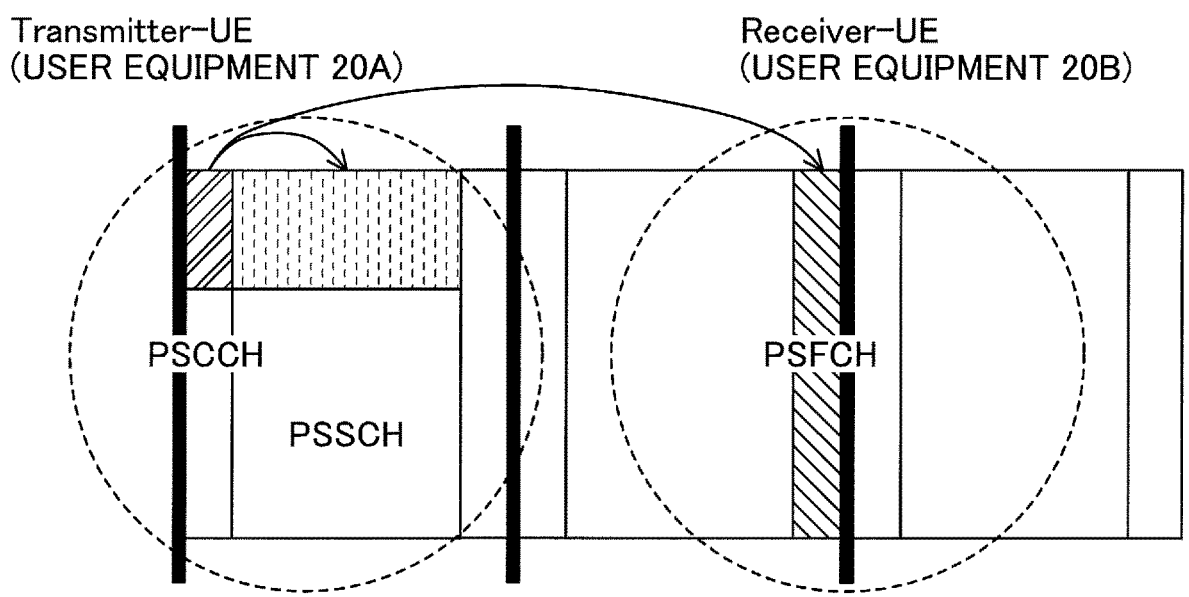
FIG. 16 is a diagram showing an example of a resource in Example 1.

FIG. 16 is a diagram illustrating an example of a resource in which a sequence of HARQ-ACK information transmitted by a user equipment 20B of a data receiving side is determined by the transmission ID, wherein a time and frequency resource of PSFCH is specified from the user equipment 20A of a data transmitting side.

As shown in FIG. 16, the user equipment 20A transmits SCI and data with PSCCH and PSSCH resources. For example, the SCI specifies the time and frequency resource of the PSFCH shown in FIG. 16. The SCI also contains a transmission ID.

The user equipment 20B uses the time and frequency resource of the PSFCH to transmit HARQ-ACK information having a sequence determined based on the transmission ID. For a sequence determined based on the transmission ID, the sequence may correspond to the transmission ID and indicate an ACK or NACK, or the sequence itself corresponds to the transmission ID, and the differentiation of ACK or NACK may be represented by another information (e.g., a cyclic shift or code applied to the sequence).

Example 1 eliminates misunderstandings about receiving HARQ-ACK information. Further, in the Example 1, since the transmission ID is not explicitly transmitted, it is not necessary to prepare a resource for transmission of the transmission ID. Therefore, it has an advantage that resources can be used efficiently.

<Countermeasure Example for Resource Collision in Example 1: Case 1>

CSI, SR, etc. may be sent by a PSFCH resource as the whole of SFCI or a part of SFCI. The method of determining the PSFCH resource according to the Example 1 may be applied not only to HARQ-ACK information but also to CSI, SR, and the like. Hereinafter, HARQ-ACK information, CSI, and SR are collectively referred to as feedback information.

Figure 17:
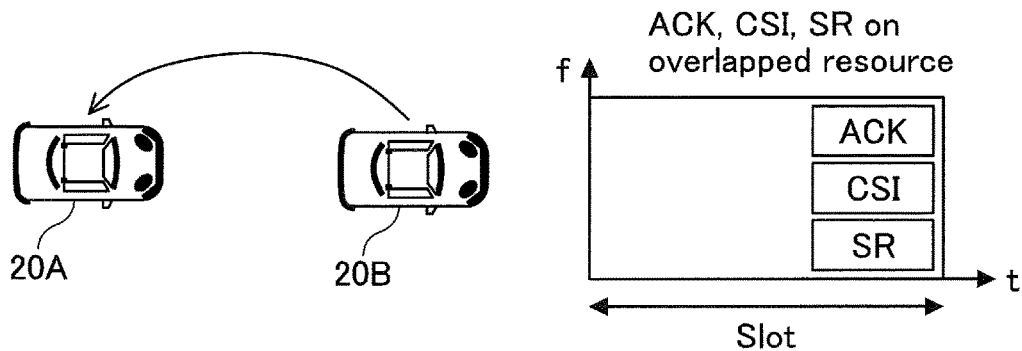
FIG. 17 is a diagram for explaining a case 1 (intra-UE collision)

When each PSFCH resource is determined based on the same transmission ID (for convenience, ID-A) for transmission of each of multiple feedback information such as HARQ-ACK information, CSI, SR, etc., PSFCH resources (time resources in the example of FIG. 17) overlap (collide) as shown in FIG. 17. In the example of FIG. 17, ACK, SCI, and SR are multiplexed in the frequency direction in the same time resource.

In this case, the user equipment 20B determines a new PSFCH resource for multiplexing the plurality of pieces of information (ACK, CSI, SR) based on ID-A and transmits the multiplexed information using the new PSFCH resource. The multiplexed information in this case is, for example, information representing ACK, CSI, and SR as a single information sequence (bit sequence). The multiplexed information is not necessarily ACK, CSI, and SR. Either of these two pieces of information may be multiplexed (this point similarly applies to other Examples).

There may be a case in which each PSFCH resource for transmission of each of multiple feedback information such as HARQ-ACK information, CSI, SR, etc. is determined by a different ID (e.g., sender UE-ID, group ID), and as shown in FIG. 17, the PSFCH resources (time resource in the example of FIG. 17) overlap (collide). In the example of FIG. 17, ACK, SCI, and SR are multiplexed in the frequency direction in the same time resource.

In this case, the user equipment 20B determines a new PSFCH resource for multiplexing these information (ACK, SCI, SR) in the method of Alt1 or Alt2 or Alt3 as follows, and transmits the multiplex information using the new PSFCH resource.

Alt1: the user equipment 20B selects one ID from a plurality of different IDs in any manner and determines a new PSFCH resource based on that ID.

Alt2: The user equipment 20B determines a new PSFCH resource using a predetermined ID, or a configured ID from base station apparatus 10, or a preconfigured ID. The ID may be one of a plurality of IDs corresponding to multiple feedback information such as HARQ-ACK information, CSI, SR, etc., or may be any other ID.

Alt3: The user equipment 20B calculates a new ID based on a plurality of IDs corresponding to a plurality of feedback information such as HARQ-ACK information, CSI, and SR, and determines a new PSFCH resource based on the ID.

<Countermeasure for Resource Collision in Example 1: Case 2>

In Example 1, for example, even if a user equipment 20 determines a plurality of PSFCH resources based on different transmission IDs to transmit respective HARQ-ACK information for a plurality of data received from different plurality of user equipments 20, the plurality of PSFCH resources may overlap (collide).

Figure 18:
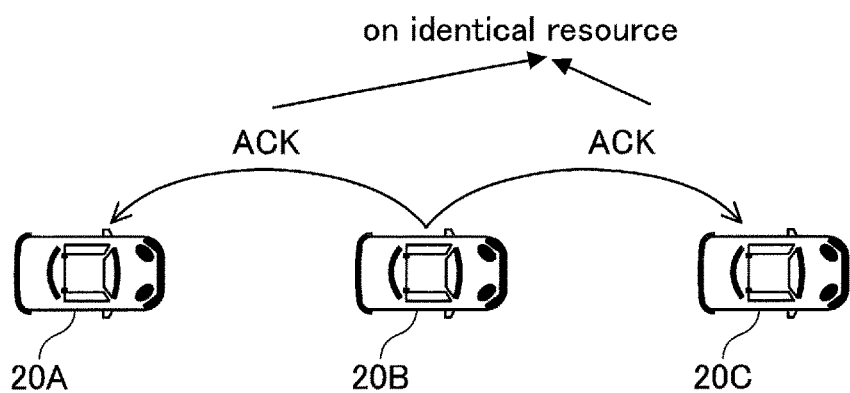
FIG. 18 is a diagram for explaining a case 2 (Inter-UE Collision)

For example, as illustrated in FIG. 18, there may be overlap between a PSFCH resource for HARQ-ACK information to be transmitted by the user equipment 20B to the user equipment 20A and a PSFCH resource for HARQ-ACK information to be transmitted by the user equipment 20B to the user equipment 20C.

In this case, the user equipment 20B transmits the HARQ-ACK information in the method of Alt1 or Alt2 below.

Alt1: When only one of a plurality of HARQ-ACK information is NACK, the user equipment 20B transmits the NACK with the PSFCH resource. If more than one NACK is included in the plurality of HARQ-ACK information, the user equipment 20B selects one NACK from the plurality of NACKs and transmits the NACK. Any method can be used as the method of selecting one NACK. As an example, the NACK with the largest (or smallest) corresponding transmission ID is sent.

Alt2: The user equipment 20B selects and transmits one or more or all of HARQ-ACK information from a plurality of HARQ-ACK information.

Example 2

In Example 2, the SFCI (more specifically HARQ-ACK information) transmitted by PSFCH is scrambled by the transmission ID (in whole or in part). The SFCI may be referred to as "sidelink feedback control information" or "feedback information".

The method of scrambling is not limited to a specific method, but for example, an exclusive logical OR is taken between each bit of the bit sequence of HARQ-ACK information and each bit of the bit sequence of transmission ID (all or a part of transmission ID) and the resulting bit sequence is transmitted as HARQ-ACK information after scrambling.

An example shown in FIG. 15 will be used to describe. In S101 and S102, the user equipment 20A transmits a SCI by a PSCCH and transmits SL data by a PSSCH.

The user equipment 20B receives the SCI (PSCCH) and SL data (PSSCH) transmitted from the user equipment 20A. For example, the SCI received by the PSCCH contains a transmission ID of the user equipment 20A and information of PSFCH resources (e.g., time and frequency resources) for transmitting HARQ-ACK for receipt of the data.

The user equipment 20B scrambles the HARQ-ACK information based on the transmission ID included in the received SCI and transmits the scrambled HARQ-ACK information in S103 using the above-described PSFCH resource.

The user equipment 20A descrambles the information received by the resource using the transmission ID. If the information after the descramble is ACK, the user equipment 20A can confirm that the data transmitted in S102 has been transmitted to the user equipment 20B normally.

Further, when the information after the descramble is NACK or nothing is received, the user equipment 20A recognizes that the data transmission of S102 was a failure and can perform a retransmission.

Example 2 eliminates misunderstandings about receiving HARQ-ACK information. In addition, also in Example 2, since the transmission ID is not explicitly transmitted, it is not necessary to prepare a resource for transmission of the transmission ID. Therefore, it has an advantage that resources can be used efficiently.

<Countermeasure for Resource Conflicts in Example 2: Case 1>

As also described in Example 1, CSI, SR, etc. may be transmitted as part or all of the SFCI in the PSFCH resource. The scramble for the HARQ-ACK information according to the Example 2 may be applied not only to the HARQ-ACK information, but also to CSI, SR, and the like.

Consider the case where multiple feedback information such as HARQ-ACK information, CSI, SR, etc. are scrambled with the same transmission ID (for convenience, ID-A), and the PSFCH resources (time resource in the example of FIG. 17) overlap (collide) as shown in FIG. 17. The state in this case is the state before scrambling is actually performed.

In this case, the user equipment 20B determines a new PSFCH resource, scrambles the multiplexed information of these information (ACK, SCI, SR) with ID-A, and transmits the scrambled multiplexed information using the new PSFCH resource.

A case may be also considered in which multiple feedback information such as HARQ-ACK information, CSI, SR, etc. are scrambled with different IDs, and as shown in FIG. 17, PSFCH resources (time resources in the example shown in FIG. 17) may overlap (collide). The state in this case is the state before the scrambling is actually performed.

In this case, the user equipment 20B determines a new PSFCH resource for multiplexing and transmitting these information (ACK, SCI, SR) and scrambles the multiplexed information in the method of Alt1 or Alt2 or Alt3 below.

Alt1: The user equipment 20B selects one ID from a plurality of IDs in any manner and scrambles the multiplexed information using the ID. For example, in the case where a group-ID and a UE-ID are included in the plurality of IDs, the user equipment 20B may select the group-ID and scramble the multiplexed information using the group-ID.

Alt2: The user equipment 20B scrambles multiplexed information using a predetermined ID, or a configured ID from the base station apparatus 10, or a preconfigured ID. The ID may be one of a plurality of IDs for scrambling multiple feedback information such as HARQ-ACK information, CSI, SR, etc., or any other ID.

Alt3: The user equipment 20B calculates a new ID based on a plurality of IDs for scrambling for each of a plurality of feedback information such as HARQ-ACK information, a CSI, and a SR, and scrambles the multiplexed information using the ID.

<Countermeasures for Resource Conflicts in Example 2: Case 2>

Also in the Example 2, for example, a plurality of PSFCH resources for transmitting, by a user equipment, respective HARQ-ACK information for a plurality of data received from a plurality of different user equipments 20 may overlap (conflict).

For example, as shown in FIG. 18, there may be overlap between the PSFCH resources for HARQ-ACK information transmitted by the user equipment 20B to the user equipment 20A and the PSFCH resources for HARQ-ACK information transmitted by the user equipment 20B to the user equipment 20C.

In such a case, the user equipment 20B selects HARQ-ACK information in the method of Alt1 or Alt2 below. The user equipment 20B scrambles and the HARQ-ACK information by the transmission ID corresponding to the selected HARQ-ACK information, and transmits it.

Alt1: When only one of a plurality of HARQ-ACK information is NACK, the user equipment 20B transmits the NACK with the PSFCH resource. If more than one NACK is included in the plurality of HARQ-ACK information, the user equipment 20B selects one NACK from the plurality of NACKs and transmits the NACK. Any method can be used as the method of selecting one NACK. As an example, a NACK having the largest (or smallest) transmission ID is sent.

Alt2: The user equipment 20B selects and transmits one or more or all of HARQ-ACK information from a plurality of HARQ-ACK information.

Example 3

In Example 3, the transmission ID (transmitter-ID) is explicitly included in a SFCI sent by PSFCH.

An example shown in FIG. 15 will be used to describe. In S101 and S102, the user equipment 20A transmits a SCI by a PSCCH and transmits SL data by a PSSCH.

The user equipment 20B receives the SCI (PSCCH) and SL data (PSSCH) transmitted from the user equipment 20A. For example, the SCI received by the PSCCH contains the transmission ID of the user equipment 20A and information about the PSFCH resources (e.g., time and frequency resources) for transmitting HARQ-ACK for receipt of the data.

The user equipment 20B includes the transmission ID included in the received SCI and HARQ-ACK information in the SFCI and transmits the SFCI in S103 using the above-described PSFCH resource.

The user equipment 20A can determine that the HARQ-ACK information contained in the SFCI is the HARQ-ACK information for the user equipment 20A after confirming that the SFCI received by the resource contains the transmission ID of the user equipment 20A.

If the HARQ-ACK information is ACK, the user equipment 20A can confirm that the data transmitted in S102 has been transmitted to the user equipment 20B successfully.

If HARQ-ACK information is NACK or receives nothing, the user equipment 20A can recognize that the data transmission of S102 was a failure and perform a retransmission.

Figure 19:
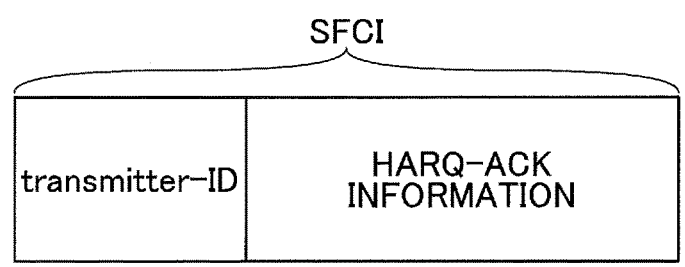
FIG. 19 is a diagram for explaining Example 3.

FIG. 19 shows an example of a SFCI that includes a transmission ID and HARQ-ACK information. For example, assuming that SFCI has S bit length, transmission ID has M bit length, and HARQ-ACK information has L bit length, then S≤M+L. However, such a bit-length relationship is only one example.

<For Channel Coding>

As also described in Examples 1 and 2, in addition to the HARQ-ACK information, CSI, SR, and the like may be transmitted as a whole of or a part of the SFCI by the PSFCH resource. In the following description, the user equipment 20B is a sender of the SFCI.

That is, the SFCI that the user equipment 20B transmits at some timing may include one, two, or all three of the HARQ-ACK information, the SR, and the CSI, as well as the transmission ID. "one, two, or all three of the HARQ-ACK information, the SR, and the CSI" is referred to as "HARQ-ACK/SR/CSI".

In this case, the user equipment 20B may encode the transmission ID separately from the HARQ-ACK/SR/CSI, or may encode the transmission ID and the HARQ-ACK/SR/CSI jointly.

Further, the user equipment 20B may not be able to transmit all of the transmission ID and HARQ-ACK/SR/CSI due to rate matching or the like. In such a case, the user equipment 20B maps the transmission ID to the PSFCH resource with the highest priority and transmits the transmission ID with the highest priority.

In addition, in order to adjust the bit length of the SFCI to the bit length that can be transmitted, when dropping any of the bits of the transmission ID and the HARQ-ACK/SR/CSI, the user equipment 20B performs dropping in the order indicated by "CSI part 2→CSI part 1→HARQ-ACK/SR-→transmitter-ID," for example. HARQ-ACK/SR means HARQ-ACK or SR, or HARQ-ACK and SR.

Example 3 eliminates misunderstandings about receiving HARQ-ACK information. Further, in the Example 3, since the transmission ID is explicitly transmitted, there is an advantage that the receiving side can clearly confirm the transmission ID.

<Countermeasure Example for a Resource Conflict in Example 3: Case 1>

As also described in Examples 1 and 2, the CSI, SR, and the like may be transmitted in the PSFCH resource as all or part of the SFCI. In addition, in Example 3, the inclusion of the transmission ID in the SFCI may be applied not only to HARQ-ACK information but also to CSI and SR.

Consider the case where the same transmission ID (ID-A for convenience) is included in each of the multiple feedback information such as HARQ-ACK information, CSI, and SR, and the PSFCH resources (time resource in the example of FIG. 17) overlap (collide) as shown in FIG. 17. In this case, it is a state before the actual inclusion of the transmission ID is performed.

In this case, the user equipment 20B multiplexes these information (ACK, SCI, and SR), and includes one ID-A in SFCI for transmitting the multiplexed information, and transmits the SFCI including the ID-A.

It can be considered that each of multiple feedback information (SFCI) such as HARQ-ACK information, CSI, SR, etc. contains different ID (a plurality of IDs), and that as shown in FIG. 17, PSFCH resources (time resources in the example shown in FIG. 17) overlap (collide).

In this case, the user equipment 20B multiplexes the information (ACK, SCI, and SR) and includes the multiplexed information in the SFCI, and transmits the SFCI by including the ID in the SFCI by the method of Alt1, Alt2, or Alt3 below.

Alt1: The user equipment 20B selects one ID from the plurality of IDs in any manner and includes the ID in the SFCI.

Alt2: The user equipment 20B includes a predetermined ID, or a configured ID from the base station apparatus 10, or a preconfigured ID in the SFCI. The ID may be one of the above-mentioned plurality of IDs or any other ID.

Alt3: The user equipment 20B includes in the SFCI all (or any multiple IDs) of a plurality of IDs corresponding to a plurality of feedback information such as HARQ-ACK information, CSI, SR, and the like.

<Countermeasure Example for a Resource Conflict in Example 3: Case 2>

Also in Example 3, for example, there is a case in which a plurality of PSFCH resources for transmitting respective HARQ-ACK information (SFCI) for a plurality of data received from different plurality of user equipments 20 overlap (collide).

For example, as shown in FIG. 18, there is a case in which the PSFCH resources for HARQ-ACK information transmitted by the user equipment 20B to the user equipment 20A and the PSFCH resources for HARQ-ACK information transmitted by the user equipment 20B to the user equipment 20C overlap.

In such a case, the user equipment 20B may, for example, transmit all IDs corresponding to each HARQ-ACK information by including the IDs in the SFCI in which a plurality of SFCIs where PSFCH resources overlap are multiplexed, or may select HARQ-ACK information for one user equipment, in the method of Alt1 or Alt2 below, and transmit a SFCI containing the HARQ-ACK information and the corresponding transmission ID.

Alt1: When only one of a plurality of HARQ-ACK information is NACK, the user equipment 20B transmits the NACK and the SFCI including the transmission ID corresponding to the NACK. If more than one NACK is included in the plurality of HARQ-ACK information, the user equipment 20B selects one NACK from the plurality of NACKs and transmits the corresponding transmission ID by including in the SFCI. Any method can be used as the method of selecting one NACK. As an example, a NACK with the largest (or smallest) transmission ID is sent.

Alt2: The user equipment 20B selects one or more or all of the HARQ-ACK information from the plurality of HARQ-ACK information and transmits each transmission ID corresponding to the selected HARQ-ACK information by including each transmission ID in the SFCI (multiplexed SFCI).

Example 4

Modifications applicable to all of Examples 1 to 3 will be described as Example 4. The "transmission ID" described in Examples 1 to 3 may be replaced by "reception ID" or "transmission ID and reception ID." As an example, an example in which "transmission ID" is replaced with "reception ID" in the Example 1 will be described with reference to FIG. 15.

In S101 and S102, the user equipment 20A transmits the SCI by the PSCCH and transmits the SL data by the PSSCH.

The SCI contains a reception ID and information of time and frequency resources of the PSFCH to transmit HARQ-ACK.

The user equipment 20B receives the SCI (PSCCH) and SL data (PSSCH) transmitted from the user equipment 20A.

The user equipment 20B determines a resource (here, a "sequence") of the HARQ-ACK information based on the reception ID included in the received SCI and transmits the HARQ-ACK information having the sequence by the time and frequency resource of the PSFCH (S103).

The user equipment 20A expects to receive the HARQ-ACK information of the sequence determined based on the reception ID (monitoring the HARQ-ACK information) by the time and frequency resources described above. If the user equipment 20A receives ACK of the expected sequence, it can be confirmed that the data transmitted in S102 has been transmitted to the user equipment 20B normally.

When the user equipment 20A receives NACK of the expected sequence or receives nothing, the data transmission of S102 can be recognized as a failure and retransmission can be performed.

It should be noted that the above is an example and the resource determined by the reception ID may be any one of a sequence, a code, a time, or a frequency, and may be any two combinations of them, any three combinations of them, or any four combinations.

For example, suppose that the resource determined by the reception ID is a time and frequency resource, and that for a different reception ID, a different time and frequency resource (orthogonal time and frequency resource) is determined. If, for example, 10 orthogonal time and frequency resources can be allocated in a single PSFCH resource transmission (reception on the receiving side) at a certain timing, the user equipment 20A on the receiving side of the HARQ-ACK can expect HARQ-ACK from 10 different user equipments 20.

In the Examples 1-4, the user equipment 20A transmitting data may be a user equipment 20 having a scheduling function in the transmission mode 2d, a header-UE, or a local manager. A cluster ID may be used as the transmission ID or the reception ID.

(Apparatus Configuration)

Next, a functional configuration example of the base station apparatus 10 and the user equipment 20 that perform the processes and operations described above will be described. The base station apparatus 10 and the user equipment 20 include functions to implement all of the Examples described above. However, the base station apparatus 10 and the user equipment 20 may each comprise only some of the functions in the Examples.

<Base Station Equipment 10>

Figure 20:
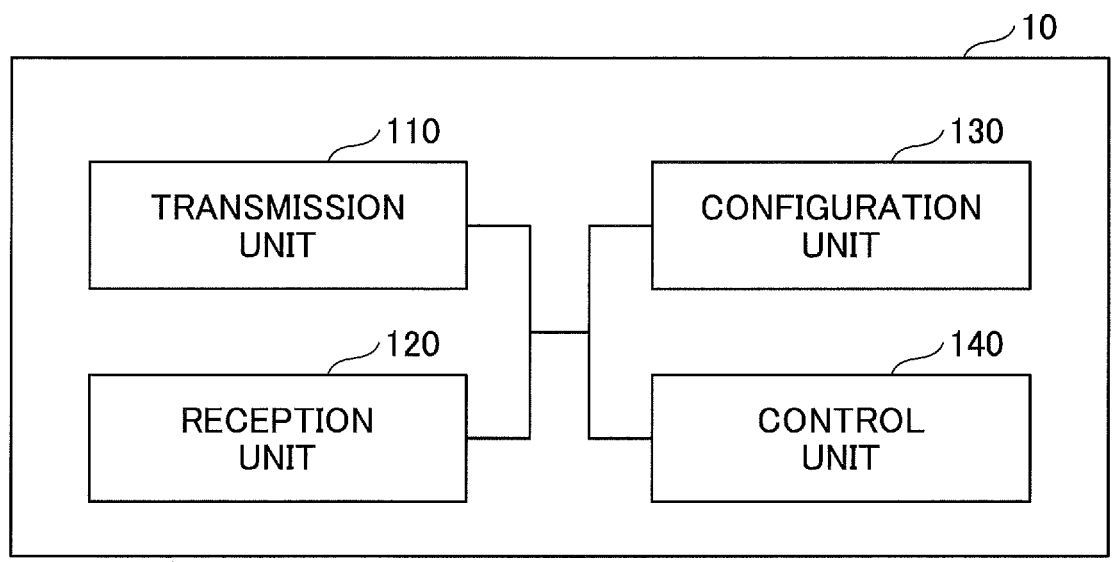
FIG. 20 is a diagram illustrating an example of a functional configuration of the base station apparatus 10 according to an embodiment of the present invention.

FIG. 20 is a diagram illustrating an example of a functional configuration of the base station apparatus 10. As shown in FIG. 20, the base station apparatus 10 includes a transmission unit 110, a reception unit 120, a configuration unit 130, and a control unit 140. The functional configuration shown in FIG. 17 is only one example. If the operation according to the embodiments of the present invention can be performed, the functional category and the name of the functional unit may be any one.

The transmission unit 110 includes a function for generating a signal to be transmitted to the user equipment 20 side and transmitting the signal wirelessly. The receiving unit 120 includes a function for receiving various signals transmitted from the user equipment 20 and acquiring, for example, information of a higher layer from the received signals. The transmission unit 110 has a function to transmit NR-PSS, NR-SSS, NR-PBCH, DL/UL control signals, DL reference signals, and the like to the user equipment 20. The transmitter unit 110 and the receiver unit 120 may be referred to as a transmitter and a receiver, respectively.

The configuration unit 130 stores the preconfigured configuration information and various configuration information to be transmitted to the user equipment 20 in the storage device and reads the preconfigured configuration information from the storage device if necessary. The contents of the configuration information are, for example, information pertaining to the configuration of sidelink communication.

The control unit 140 performs processing pertaining to the configuration in which the user equipment 20 performs sidelink communication. The control unit 140 transmits scheduling information of sidelink communication to the user equipment 20 through the transmission unit 110. A function unit related to signal transmission in the control unit 140 may be included in the transmission unit 110, and a function unit related to signal reception in the control unit 140 may be included in the receiving unit 120.

<User Equipment 20>

Figure 21:
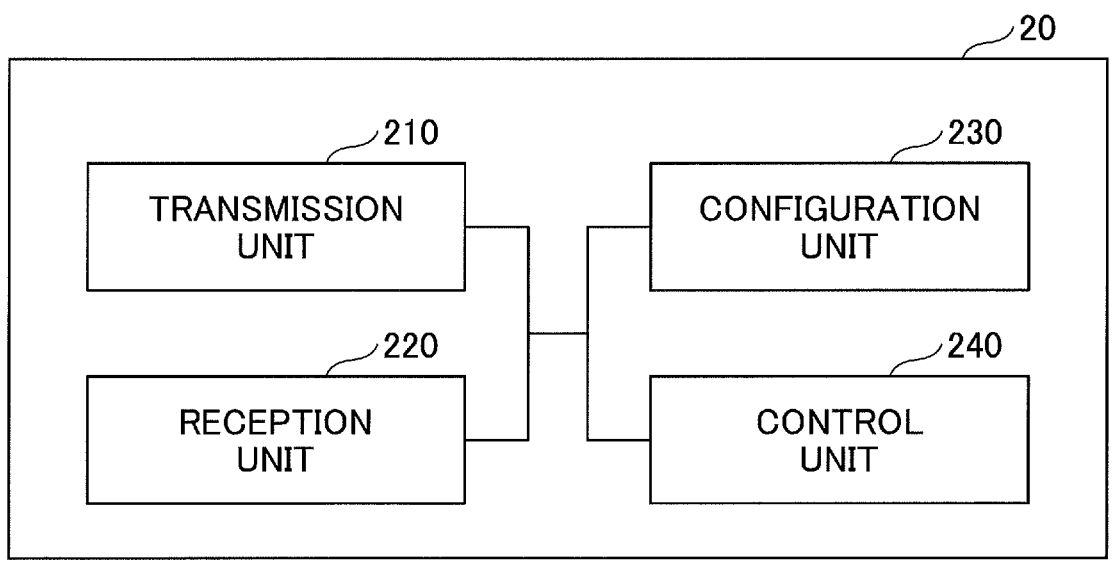
FIG. 21 is a diagram illustrating an example of a functional configuration of a user equipment 20 according to an embodiment of the present invention.

FIG. 21 is a diagram illustrating an example of a functional configuration of a user equipment 20. As shown in FIG. 21, the user equipment 20 includes a transmission unit 210, a reception unit 220, a configuration unit 230, and a control unit 240. The functional configuration shown in FIG. 21 is only one example. If the operation according to the embodiments of the present invention can be performed, the functional category and the name of the functional unit may be any one.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function to receive NR-PSS, NR-SSS, NR-PBCH, DL/UL/SL control signals or reference signals transmitted from the base station apparatus 10. For example, the transmitting unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another user equipment 20 as sidelink communication, and the receiving unit 220 receives PSCCH, PSSCCH, PSDCH, or PSBCH from another user equipment 20. The transmitting unit 210 and the receiving unit 220 may be called a transmitter and a receiver, respectively.

The configuration unit 230 stores various configuration information received from the base station apparatus 10 or the user equipment 20 by the receiving unit 220 in the storage device and reads it from the storage device as necessary. The configuration unit 230 also stores preconfigured configuration information. The contents of the configuration information are, for example, information pertaining to the configuration of sidelink communication.

The control unit 240 controls sidelink communication with other user equipments 20. The control unit 240 may schedule sidelink communication to other user equipments 20. A function unit related to signal transmission in the control unit 240 may be included in the transmission unit 210, and a function unit related to signal reception in the control unit 240 may be included in the receiving unit 220.

(Hardware Configuration)

The block diagrams (FIG. 20 and FIG. 21) used in the description of the above-mentioned embodiment illustrate the blocks of the function units. The functional blocks (configuration units) are implemented by at least one of any combinations of hardware and software. A method for implementing each functional block is not particularly limited. That is, each functional block may be implemented by using one apparatus that is physically or logically coupled or by connecting two or more apparatuses which are physically or logically separated from each other directly or indirectly (for example, wirelessly or in a wired manner) and using the plurality of apparatuses. The functional blocks may be implemented by combining software with the one apparatus or the plurality of apparatuses.

The functions include judgment, decision, determination, computation, calculation, processing, derivation, investigation, search, confirmation, reception, transmission, output, access, resolution, selection, choice, establishment, comparison, assumption, expectation, consideration, broadcasting, notifying, communicating, forwarding, configuring, reconfiguring, allocating, mapping, and assigning. However, the functions are not limited thereto. For example, a functional block (configuration unit) having a transmission function is referred to as a transmitting unit or a transmitter. In any case, as described above, a method for implementing the functional block is not particularly limited.

Figure 22:
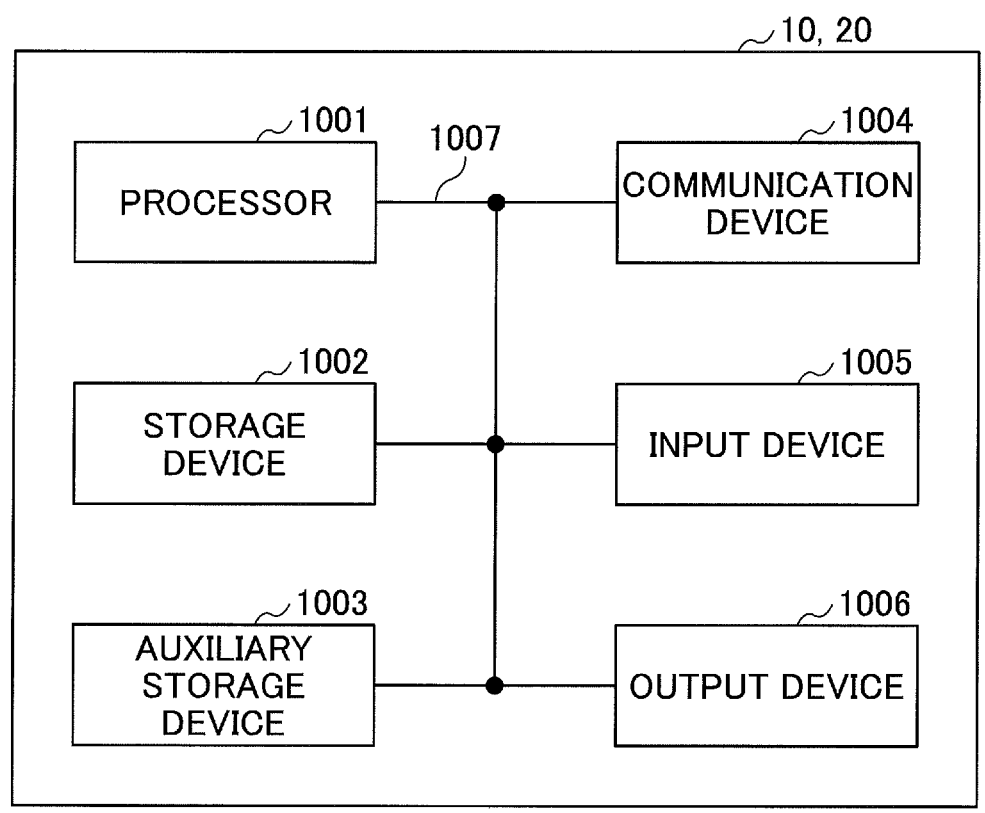
FIG. 22 is a diagram illustrating an example of the hardware configuration of the base station apparatus 10 or the user equipment 20 according to an embodiment of the present invention.

For example, the base station apparatus 10, the user equipment 20, or the like according to an embodiment of the present disclosure may function as a computer for processing the radio communication method of the present disclosure. FIG. 22 is a diagram illustrating an example of the hardware configuration of the base station apparatus 10 and the user equipment 20 according to an embodiment of the present disclosure. The base station apparatus 10 and the user equipment 20 described above may be physically configured as a computer device including a processor 1001, a storage device 1002, an auxiliary storage device 1003, a communication apparatus 1004, an input device 1005, an output device 1006, a bus 1007, or the like.

In the following description, the term "apparatus" can be read as circuits, devices, units, etc. The hardware configuration of the base station apparatus 10 and the user equipment 20 may be configured to include one or more of the devices shown in the figure or may be configured without some of the devices.

Each function in the base station apparatus 10 and the user equipment 20 is realized by having the processor 1001 perform an operation by reading predetermined software (programs) on hardware such as the processor 1001 and the storage device 1002, and by controlling communication by the communication apparatus 1004 and controlling at least one of reading and writing of data in the storage device 1002 and the auxiliary storage device 1003.

Processor 1001 operates, for example, an operating system to control the entire computer. The processor 1001 may be comprised of a central processing unit (CPU) including an interface with peripheral devices, a controller, an arithmetic unit, a register, and the like. For example, the above-described control unit 140, control unit 240, and the like may be implemented by the processor 1001.

The processor 1001 reads out a program (program code), software module, data, or the like from at least one of the auxiliary storage device 1003 and the communication apparatus 1004 to the storage device 1002 and performs various processing in accordance with the above. As a program, a program that causes a computer to execute at least a part of the operation described in the above-described embodiment is used. For example, the control unit 140 of the base station apparatus 10 illustrated in FIG. 20 may be stored in the storage device 1002 and implemented by a control program operating in the processor 1001. For example, the control section 240 of the user equipment 20 illustrated in FIG. 21 may be stored in the storage device 1002 and implemented by a control program operating in the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

Storage 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. Storage 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, and the like. The storage medium described above may be, for example, a database, a server, or other suitable medium that includes at least one of a storage device 1002 and an auxiliary storage device 1003.

The communication apparatus 1004 is a hardware (transmitting/receiving device) for performing communication between computers via at least one of a wired network and a wireless network, and is also referred to as a network device, a network controller, a network card, a communication module, or the like. Communications device 1004 may comprise a high frequency switch, duplexer, filter, frequency synthesizer, or the like, for example, to implement at least one of a frequency division duplex and a time division duplex. For example, the transmitting/receiving antenna, the amplifier unit, the transceiving unit, the transmission line interface, and the like may be implemented by the communication apparatus 1004. Transmitters and receptacles may be physically or logically isolated implementations of the transmitters and receivers.

Input device 1005 is an input device (e.g., a keyboard, mouse, microphone, switch, button, sensor, etc.) that accepts external input. Output device 1006 is an output device (e.g., a display, speaker, LED lamp, etc.) that implements an external output. The input device 1005 and the output device 1006 may have an integral configuration (for example, a touch panel).

Each device, such as processor 1001 and storage 1002, is connected by a bus 1007 for communicating information. Bus 1007 may be constructed using a single bus or may be constructed using different buses between devices.

The base station apparatus 10 and the user equipment 20 may also include hardware, such as a microprocessor, a digital signal processor (DSP), an ASIC (Application Specific Integrated Circuit), a PLD (Programmable Logic Device), and an FPGA (Field Programmable Gate Array), all or part of each function block may be realized by the hardware. For example, processor 1001 may be implemented using at least one of the hardware.

(Summary of Embodiments)

As described above, as an example, the user equipment according to the present embodiment is configured as shown in the following first to sixth items.

Item 1

A user equipment including:
- a reception unit configured to receive sidelink data from a transmission side user equipment; and
- a transmission unit configured to transmit feedback information for the sidelink data,
- wherein the transmission unit transmits the feedback information using a resource determined based on a transmission ID that is an ID on the transmission side user equipment, or a reception ID that is an ID on the user equipment, or both of the transmission ID and the reception ID.

Item 2

The user equipment as described in item 1, wherein the transmission unit transmits the feedback information having a sequence that is the resource using a time and frequency resource notified from the transmission side user equipment.

Item 3

A user equipment including:
- a reception unit configured to receive sidelink data from a transmission side user equipment; and
- a transmission unit configured to transmit feedback information for the sidelink data,
- wherein the transmission unit scrambles the feedback information using a transmission ID that is an ID on the transmission side user equipment, or a reception ID that is an ID on the user equipment, or both of the transmission ID and the reception ID, and transmits the scrambled feedback information.

Item 4

A user equipment including:
- a reception unit configured to receive sidelink data from a transmission side user equipment; and
- a transmission unit configured to transmit feedback information for the sidelink data,
- wherein the transmission unit transmits the feedback information together with a transmission ID that is an ID on the transmission side user equipment, or a reception ID that is an ID on the user equipment, or both of the transmission ID and the reception ID.

Item 5

The user equipment as described in item 4, wherein, when the transmission unit cannot transmit all of the transmission ID, or the reception ID, or both of the transmission ID and the reception ID, and the feedback information, the transmission unit preferentially transmits the transmission ID, or the reception ID, or both of the transmission ID and the reception ID.

Item 6

A feedback information transmission method executed by a user equipment, including:
- a step of receiving sidelink data from a transmission side user equipment;
- a step of transmitting feedback information for the sidelink data using a resource determined based on a transmission ID that is an ID on the transmission side user equipment, or a reception ID that is an ID on the user equipment, or both of the transmission ID and the reception ID.

According to the configuration described in items 1, 3, 5 and 6, a technique is provided that enables the proper execution of the HARQ operation in the sidelink. More specifically, misunderstandings related to receiving HARQ-ACK information can be eliminated.

In addition, according to the structure described in item 2, since the sequence to be transmitted is determined based on the ID, the feedback information can be transmitted efficiently without using resources only for the ID.

Further, according to the configuration described in item 5, since the ID can be transmitted at least, the receiver of the ID can estimate, for example, that the data transmitted by the receiver of the ID can be transmitted.

(Supplement to Embodiments)

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station apparatus 10 and user equipment 20 have been described using a functional block diagram, but such devices may be implemented in hardware, software, or a combination thereof. Software operated by a processor of the base station apparatus 10 in accordance with embodiments of the present invention and software operated by a processor of the user equipment 20 in accordance with embodiments of the present invention may be stored in random access memory (RAM), flash memory, read-only memory (ROM), EPROM, EEPROM, register, hard disk (HDD), removable disk, CD-ROM, database, server, or any other suitable storage medium.

The notification of information is not limited to the aspect/embodiment described in the present disclosure and may be performed by other methods. For example, the notification of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) or a system information block (SIB)), other types of signaling, or a combination thereof. The RRC signaling may also be referred to as an RRC message. For example, the RRC signaling may be an RRC connection setup message or an RRC connection reconfiguration message.

Each aspect/embodiment described in the present disclosure may be applied to at least one of systems using Long Term Evolution (LTE), LTE-Advanced (LTE-A), SUPER 3G, IMT-Advanced, a 4th generation mobile communication system (4G), a 5th generation mobile communication system (5G), Future Radio Access (FRA), new Radio (NR), W-CDMA (registered trademark), GSM (registered trademark), CDMA2000, Ultra Mobile Broadband (UMB), IEEE 802.11 (Wi-Fi (registered trademark)), IEEE 802.16

(WiMAX (registered trademark)), IEEE 802.20, Ultra-WideBand (UWB), Bluetooth (registered trademark), and other appropriate systems and next-generation systems extended on the basis of these systems. In addition, a plurality of systems may be combined (for example, a combination of at least one of LTE and LTE-A and 5G) and then applied.

For example, the order of the process procedures, the sequence, and the flowchart in each aspect/embodiment described in the specification may be interchanged as long as there is no contradiction. For example, in the method described in the present disclosure, elements of various steps are presented using an exemplary order and the invention is not limited to the presented specific order.

The particular operation herein described as performed by the base station apparatus 10 may in some instances be performed by its upper node. In a network of one or more network nodes having the base station apparatus 10, it will be apparent that various operations performed for communication with the user equipment 20 can be performed by at least one of other network nodes other than the base station apparatus 10 and the base station apparatus 10 (e.g., but not limited to MME, S-GW, etc.). Although the above illustrates that there is only one other network node other than the base station apparatus 10, the other network nodes may be a combination (e.g., MME and S-GW) of a plurality of other network nodes.

For example, the information and the signals described in the present disclosure can be output from a higher layer (or a lower layer) to a lower layer (or a higher layer). The information and the signals may be input or output through a plurality of network nodes.

For example, the input or output information may be stored in a specific location (for example, a memory) or may be managed using a management table. For example, the input or output information may be overwritten, updated, or edited. For example, the output information may be deleted. For example, the input information may be transmitted to other apparatuses.

The determination described in the present disclosure may be performed with a value (0 or 1) represented by 1 bit, may be performed by a true or false value (Boolean: true or false), or may be performed by comparison with a numerical value (for example, comparison with a predetermined value).

Of course, regardless of whether software is referred to as software, firmware, middleware, a microcode, or a hardware description language or is referred to as other names, the software needs be interpreted broadly to mean, for example, a command, a command set, a code, a code segment, a program code, a program, a sub-program, a software module, an application, a software application, a software package, a routine, a subroutine, an object, an executable file, an execution thread, a procedure, and a function.

In addition, for example, software, a command, and information may be transmitted or received through a transmission medium. For example, in a case in which software is transmitted from a website, a server, or other remote sources by at least one of a wired technology (for example, a coaxial cable, an optical fiber cable, a twisted pair, or a digital subscriber line (DSL)) and a wireless technology (for example, infrared rays or microwaves), at least one of the wired technology and the wireless technology is included in the definition of a transmission medium.

For example, the information and the signals described in the present disclosure may be represented by any of various other techniques. For example, the data, the order, the command, the information, the signal, the bit, the symbol, and the chip mentioned throughout the above description may be represented by a voltage, a current, an electromagnetic wave, a magnetic field or a magnetic particle, an optical field or a photon, or any combination thereof.

The terms described in the present disclosure and/or the terms necessary to understand the present disclosure may be replaced with terms that have the same or similar meanings. For example, at least one of a channel and a symbol may be a signal (signaling). In addition, a signal may be a message. Further, a component carrier (CC) may be referred to as, for example, a carrier frequency, a cell, or a frequency carrier.

The terms "system" and "network" used in the present disclosure are compatibly used.

For example, the information and the parameter described in the present disclosure may be represented by an absolute value, may be represented by a relative value from a predetermined value, or may be represented by another piece of corresponding information. For example, a radio resource may be instructed by an index.

The names used for the above-mentioned parameters are not limited in any respect. Further, for example, a numerical expression using the parameters may be different from the numerical expression described explicitly in the present disclosure. Since various channels (for example, PUCCH and PDCCH) and information elements can be identified by appropriate names, various names assigned to the various channels and information elements are not limited in any respect.

In the present disclosure, for example, the terms "base station (BS)", "radio base station", "base station apparatus", "fixed station", "NodeB", "eNodeB (eNB)", "gNodeB (gNB)", "access point", "transmission point", "reception point", "transmission/reception", "cell", "sector", "cell group", "carrier", and "component carrier" can be compatibly used. The base station may also be referred to as, for example, a macro cell, a small cell, a femto cell, or a pico cell.

The base station can accommodate one cell or a plurality (for example, three) of cells. In a case in which the base station accommodates a plurality of cells, the entire coverage area of the base station can be divided into a plurality of small areas and each of the small areas can also provide a communication service using a base station subsystem (for example, an indoor small-sized base station (remote radio head (RRH)). The term "cell" or "sector" refers to a part or all of the coverage area of at least one of the base station and the base station subsystem that provide a communication service in the coverage.

In the present disclosure, for example, the terms "mobile station (MS)", "user terminal", "user equipment (UE)", and "terminal" can be compatibly used.

The mobile station may be referred to as a "subscriber station", a "mobile unit", a "subscriber unit", a "wireless unit", a "remote unit", a "mobile device", a "wireless device", a "wireless communication device", a "remote device", a "mobile subscriber station", an "access terminal," a "mobile terminal", a "wireless terminal", a "remote terminal", a "handset", a "user agent", a "mobile client", a "client", or some other suitable terms, depending on the person skilled in the art.

At least one of the base station and the mobile station may be referred to as, for example, a transmitting device, a receiving device, or a communication device. In addition, at least one of the base station and the mobile station may be a moving body or a device provided in the moving body. The moving body may be a vehicle (for example, a car or an airplane), an unmanned moving body (for example, a drone or an autonomous driving vehicle), or a robot (a manned type or an unmanned type). Further, at least one of the base station and the mobile station includes a device that does not necessarily move during a communication operation. For example, at least one of the base station and the mobile station may be an Internet of Things (IoT) device such as a sensor.

In addition, the base station in the present disclosure may be read by the user terminal. For example, each aspect/embodiment of the present disclosure may be applied to a configuration in which communication between base stations and user terminals is replaced by communication between multiple user equipments 20 (e.g., may be referred to as D2D (Device-to-Device), V2X (Vehicle-to-Everything), etc.). In this case, the function of the base station apparatus 10 described above may be provided by the user equipment 20. The phrases "upstream" and "downstream" may also be replaced by the phrases corresponding to terminal-to-terminal communication (e.g., "side"). For example, an uplink channel, a downlink channel, or the like may be read by a side channel.

Similarly, the user terminal in the present disclosure may be read by the base station. In this case, the base station may have the functions provided by the user terminal described above.

The term "determining" used in the present disclosure includes a wide variety of operations in some cases. The "determining" can include cases in which performing, for example, judging, calculating, computing, processing, deriving, investigating, looking up, search, or inquiry (for example, looking up in a table, a database, or other data structures), and ascertaining is considered to perform "determining". In addition, the "determining" can include cases in which performing, for example, receiving (for example, receiving information), transmitting (for example, transmitting information), inputting, outputting, and accessing (for example, accessing data in a memory) is considered to perform "determining". Further, the "determining" can include cases in which performing, for example, resolving, selecting, choosing, establishing, and comparing is considered to be perform "determining". That is, the "determining" can include a case in which any operation is considered to perform "determining". Furthermore, the "determining" may be replaced with, for example, "assuming", "expecting", or "considering".

The terms "connected" and "coupled" or all modifications of the terms mean all direct or indirect connection or coupling between two or more elements and can include the presence of one or more intermediate elements between two mutually "connected" or "coupled" elements. The connection or coupling between elements may be physical connection, logical connection, or any combination thereof. For example, the "connection" may be replaced with "access". In a case in which the connection or the coupling is used in the present disclosure, two elements can be considered to be mutually "connected" or "coupled" by using at least one of one or more electric wires, cables, and printed electric connection and by using electromagnetic energy with wavelengths in a radio frequency domain, a microwave domain, and an optical (both visible and invisible) domain as several non-limited and non-inclusive examples.

A reference signal can also be abbreviated to RS (reference signal) and may also be referred to as a pilot according to the standard to be applied.

The term "based on" used in the present disclosure does not mean "based on only" unless otherwise stated. In other words, the term "based on" means both "based on only" and "based on at least".

Any reference to elements using, for example, names "first" and "second" used in the present disclosure does not generally limit the quantity or order of those elements. The names can be used in the present disclosure as methods used to conveniently distinguish two or more elements from each other. Therefore, the reference to the first and second elements does not mean that only two elements are employed or the first element is prior to the second element in a certain form.

In the configuration of each of the above-mentioned apparatuses, the term "means" may be replaced with a "unit", a "circuit", or a "device".

In the present disclosure, in a case in which the terms "include" and "including" and modifications thereof are used, the terms are intended to be inclusive, as is the term "comprising". Further, the term "or" used in the present disclosure is not intended to be an exclusive OR.

A radio frame may be configured by one frame or a plurality of frames in the time domain. One frame or a plurality of frames may also be referred to as subframes in the time domain. The subframe may be configured by one slot or a plurality of slots in the time domain. The subframe may be a fixed time length (for example, 1 ms) that does not depend on numerology.

The numerology may be a communication parameter that is applied to at least one of the transmission and reception of a certain signal or channel. The numerology may indicate, for example, at least one of a subcarrier spacing (SCS), a bandwidth, a symbol length, a cyclic prefix length, a transmission time interval (TTI), the number of symbols per TTI, the configuration of radio frame, a specific filtering process performed by a transceiver in the frequency domain, and a specific windowing process performed by the transceiver in the time domain.

The slot may also be configured by one symbol or a plurality of symbols (for example, orthogonal frequency division multiplexing (OFDM) symbols or single carrier frequency division multiple access (SC-FDMA) symbols) in the time domain. The slot may be a time unit based on the numerology.

The slot may include a plurality of minislots. Each minislot may be configured by one symbol or a plurality of symbols in the time domain. In addition, the minislot may be referred to as a sub-slot. The minislot may be configured by symbols whose number is less than the number of slots. PDSCH (or PUSCH) that is transmitted in a time unit larger than the minislot may be referred to as a PDSCH (or PUSCH) mapping type A. The PDSCH (or PUSCH) transmitted using the minislot may be referred to as a PDSCH (or PUSCH) mapping type B.

Each of the radio frame, the subframe, the slot, the minislot, and the symbol indicates a time unit when a signal is transmitted. For each of the radio frame, the subframe, the slot, the minislot, and the symbol may be called different names corresponding thereto.

For example, one subframe may also be referred to as a transmission time interval (TTI), a plurality of consecutive subframes may also be referred to as a TTI, or one slot or one minislot may also be referred to as a TTI. That is, at least one of the subframe and the TTI may be a subframe (1 ms) in the existing LTE, a period (for example, 1 to 13 symbols) shorter than 1 ms, or a period longer than 1 ms. In addition, the unit indicating the TTI is not referred to as the subframe, but may be referred to as, for example, a slot or minislot.

Here, the TTI means, for example, a minimum time unit of scheduling in wireless communication. For example, in the LTE system, a base station performs scheduling to allocate radio resources (for example, frequency bandwidths and transmission power which can be used by each user equipment 20) to a mobile station in the TTI unit. The definition of the TTI is not limited thereto.

The TTI may be the transmission time unit of, for example, a channel-encoded data packet (transport block), a code block, or a code word or may be the processing unit of, for example, scheduling or link adaptation. In addition, the number of slots (the number of minislots) forming the minimum time unit of scheduling may be controlled. When the TTI is assigned, a time interval (for example, the number of symbols) in which a transport block, a code block, a code word, or the like is actually mapped may be shorter than the TTI.

In a case in which one slot or one minislot is referred to as a TTI, one or more TTIs (that, one or more slots or one or more minislots) may be the minimum time unit of scheduling. In addition, the number of slots (the number of minislots) forming the minimum time unit of scheduling may be controlled.

A TTI having a time duration of 1 ms may be referred to as, for example, a general TTI (TTI in LTE Rel. 8-12), a normal TTI, a long TTI, a general subframe, a normal subframe, a long subframe, or a slot. A TTI that is shorter than the general TTI may be referred to as, for example, a shortened TTI, a short TTI, a partial TTI or a fractional TTI, a shortened subframe, a short subframe, a minislot, a subslot, or a slot.

The long TTI (for example, a general TTI or a subframe) may be replaced with a TTI having a time duration greater than 1 ms and the short TTI (for example, a shortened TTI) may be replaced with a TTI having a TTI duration that is shorter than the TTI duration of the long TTI and is equal to or greater than 1 ms.

A resource block (RB) is the unit of resource allocation in the time domain and the frequency domain and may include one subcarrier or a plurality of consecutive subcarriers in the frequency domain. The number of subcarriers included in the RB may be the same regardless of the numerology and may be, for example, 12. The number of subcarriers included in the RB may be determined on the basis of the numerology.

The time domain of the RB may include one symbol or a plurality of symbols and may be the length of one slot, one minislot, one subframe, or one TTI. For example, each of one TTI and one subframe may be configured by one resource block or a plurality of resource blocks.

One RB or a plurality of RBs may be referred to as, for example, a physical resource block (PRB), a subcarrier group (SCG), a resource element group (REG), a PRB pair, or an RB pair.

Furthermore, the resource block may be configured by one resource element (RE) or a plurality of REs. For example, one RE may be a radio resource region of one subcarrier and one symbol.

A bandwidth part (BWP) (may be referred to as a partial bandwidth) may indicate a subset of continuous common resource blocks (RBs) for a certain neurology in a certain carrier. Here, the common RB may be specified by an RB index based on a common reference point of the carrier. A PRB may be defined by a BWP and may be numbered within the BWP.

The BWP may include a UL BWP and a DL BWP. One BWP or a plurality of BWPs may be configured in one carrier for the UE.

At least one of the configured BWPs may be active and the UE may not expect to transmit and receive predetermined signals/channels outside the active BWP. In the present disclosure, for example, a "cell" and a "carrier" may be replaced with a "BWP".

For example, the structures of the radio frame, the subframes, the slot, the minislot, and the symbol described above are only examples. For example, configurations, such as to the number of subframes included in the radio frame, the number of slots per subframe or radio frame, the number of minislots included in the slot, the number of symbols and RBs included in the slot or the minislot, the number of subcarriers included in the RB, the number of symbols in the TTI, a symbol duration, the length of a cyclic prefix (CP), can be changed in various manners.

In the present disclosure, for example, in a case in which the articles, such as a, an, and the, in English are added in translation, the present disclosure may include that the nouns that follow these articles are plural.

In the present disclosure, the term "A and B are different" may mean that "A and B are different from each other". The term may also mean that "A and B are different from C". The terms "separated" and "coupled" may be interpreted in the same way as "different".

The aspects/embodiments described in the present disclosure may be independently used, may be combined, or may be switched and used in accordance with execution. In addition, the notification of predetermined information (for example, the notification of "being X") is not limited to being performed explicitly and may be performed implicitly (for example, the notification of the predetermined information is not performed).

In the present disclosure, side link communication is an example of direct communication between terminals.

The present disclosure has been described in detail above. However, it should be apparent to those skilled in the art that the present disclosure is not limited to the embodiments described in the present disclosure. The present disclosure can be embodied as corrected and changed aspects without departing from the scope and spirit of the present disclosure defined by the claims. Therefore, the description of the present disclosure has been made for exemplary description and is not intended to have any restrictive meaning to the present disclosure.

DESCRIPTION OF SYMBOLS

10 Base station apparatus
110 Transmission unit
120 Receiving unit
130 Configuration unit
140 Control unit
20 User equipment
210 Transmission unit
220 Receiving unit
230 Configuration unit
240 Control unit
1001 Processor
1002 Storage unit
1003 Auxiliary storage unit
1004 Communication device
1005 Input device
1006 Output device

The invention claimed is:

1. A terminal comprising:
   a receiver configured to receive data and control information by sidelink;
   a processor configured to determine a resource for transmitting feedback information for the data based on a transmission source ID included in the control information; and
   a transmitter configured to transmit the feedback information by the resource,
   wherein the processor is configured to determine the resource by using a function that inputs the transmission source ID and outputs information indicating the resource.

2. The terminal as claimed in claim 1, wherein the resource for transmitting the feedback information is associated with a transmission resource of the data.

3. A terminal comprising:
   a transmitter configured to transmit data and control information by sidelink; and
   a receiver configured to receive feedback information for the data, wherein the feedback information is transmitted by a resource that is determined based on a transmission source ID included in the control information,
   wherein the receiver receives the feedback information by the resource that is determined by using a function that inputs the transmission source ID and outputs information indicating the resource.

4. A communication method executed by a terminal, the communication method comprising:
   receiving data and control information by sidelink;
   determining a resource for transmitting feedback information for the data based on a transmission source ID included in the control information;
   transmitting the feedback information by the resource; and
   determining the resource by using a function that inputs the transmission source ID and outputs information indicating the resource.

* * * * *